US012124469B1

(12) United States Patent
Knight et al.

(10) Patent No.: US 12,124,469 B1
(45) Date of Patent: Oct. 22, 2024

(54) SYSTEMS AND METHODS FOR DATA LAYOUT SELECTION

(71) Applicant: The MathWorks, Inc., Natick, MA (US)

(72) Inventors: Jocelyn Knight, Cambridge (GB); Benjamin Hinkle, Brookline, MA (US); Gautam Pendse, Hopkinton, MA (US); Richard Lang, Royston (GB); Jon Cherrie, Histon (GB); Christine Tobler, Ismaning (DE); Christopher Turnes, Natick, MA (US)

(73) Assignee: The Math Works, Inc., Natick, MA (US)

( * ) Notice: Subject to any disclaimer, the term of this patent is extended or adjusted under 35 U.S.C. 154(b) by 371 days.

(21) Appl. No.: 16/946,780

(22) Filed: Jul. 6, 2020

Related U.S. Application Data

(60) Provisional application No. 63/038,090, filed on Jun. 11, 2020.

(51) Int. Cl.
*G06F 16/25* (2019.01)
(52) U.S. Cl.
CPC .................. *G06F 16/252* (2019.01)

(58) Field of Classification Search
CPC ..................................... G06F 16/252
See application file for complete search history.

(56) References Cited

U.S. PATENT DOCUMENTS

| 2018/0096226 | A1* | 4/2018 | Aliabadi | G06N 3/10 |
| 2019/0278593 | A1* | 9/2019 | Elango | G06F 8/447 |
| 2021/0158132 | A1* | 5/2021 | Huynh | G06N 3/063 |

* cited by examiner

*Primary Examiner* — Anhtai V Tran
*Assistant Examiner* — Xiaoqin Hu
(74) *Attorney, Agent, or Firm* — Finnegan, Henderson, Farabow Garrett & Dunner, LLP

(57) ABSTRACT

Systems and methods are provided for performing at least one operation using data in a preferred data layout, while preserving the ability to access the data in an original data layout. The preferred data layout may be independent of the original data layout. The preferred data layout may be selected based on at least one of a characteristic of the data, a characteristic of the computing environment or computing device(s) implementing the computing environment, a characteristic of the at least one operation, or historical performance data. The data may be rearranged or permuted into the preferred layout. A mapping may be determined between the preferred layout and the original layout. During performance of the at least one operation using the data in the preferred layout, another operation may use the mapping to access the data in the original layout.

22 Claims, 7 Drawing Sheets

SYSTEMS AND METHODS FOR DATA LAYOUT SELECTION

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
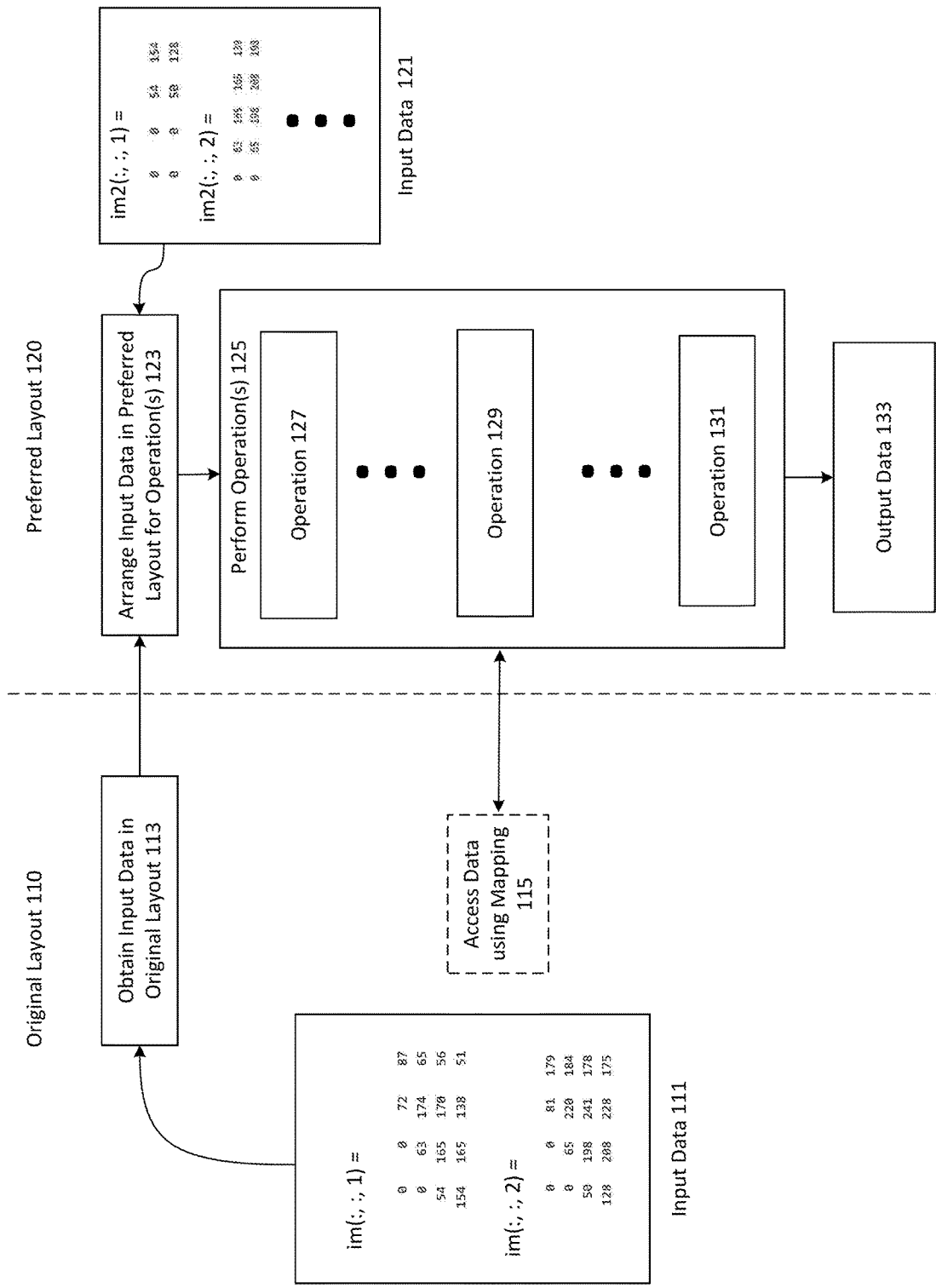
FIG. 1 depicts an application of an exemplary method for performing operations using a preferred data layout, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added, or steps may be removed, without departing from the envisioned embodiments. Thus the materials, methods, and examples are illustrative only and are not intended to be necessarily limiting.

A computing device may perform an operation using stored data with improved performance (e.g., increased speed, reduced number of data access operations, or the like) when the physical layout of the stored data permits efficient data access. Performing such an operation (e.g., referred to herein as "preferred layout operations") may include accessing the data in a particular access order. When the access order matches the physical layout of the data, the computing device may be able to access the data more efficiently (e.g., using fewer input/output operations that read or write more data in each operation, or the like). Such a data layout, referred to herein as a preferred data layout, may reduce the amount of time required to perform preferred layout operations that require repeatedly accessing data or accessing substantial amounts of data (e.g., convolution of multi-dimensional arrays, or the like).

Applications involving lengthy data processing pipelines may particularly benefit from processing data in a preferred data layout. Examples of such applications include artificial intelligence applications (e.g., machine learning, AI image and signal processing, and the like) and data science applications. Such applications may apply sequences of preferred layout operations to input data. The preferred layout operations may be configured as filters, returning output data in the same layout as the input and potentially with the same semantics (e.g., both the input and output may be images). As the preferred layout may be the same for more than one (e.g., many or all preferred layout operations) in the sequence, the benefit from initially permuting input data from an original layout to a preferred layout and then performing the sequence of preferred layout operations (e.g., without permuting the input data back into the original layout) may be significant, and may increase with the number of preferred layout operations in the pipeline.

Existing computing environments may not be configured to take advantage of preferred data layouts. Existing computing environments may be unable to determine the preferred data layout for an operation (or set of operations) or the original layout of the data. Consequently, such computing environments may be unable to determine whether a data layout is preferred for an operation. Furthermore, existing computing environments may be unable to efficiently accommodate operations with differing preferred layouts. Rearranging or permuting the physical data layout into the layout preferred by an operation, before performing the operation, may require more time than is gained by performing the operation on data in the preferred layout. Additionally, existing computing environments may not be configured to enable other operations to correctly access data rearranged or permuted into a preferred layout. In some instances, some such operations (e.g. referred to herein as "original layout operations") may be configured to expect the original layout, which may differ from the preferred layout. Furthermore, the preferred layout may depend on the hardware or run-time environment of the computing device performing the preferred layout operation. The preferred layout may therefore be unknown until the preferred layout operations are performed, potentially preventing a user from anticipating or handling the differences between the original and preferred layouts. Rearranging or permuting the data into a preferred layout may therefore cause original layout operations that access data after it has been rearranged or permuted to access the wrong data.

The disclosed embodiments improve upon existing computing environments by supporting performance of operations in preferred data layouts. A computing environment consistent with disclosed embodiments may be configured to determine an original data layout and the preferred data layout for an operation (or set of operations). The computing environment can be configured to determine, based on the original layout and the preferred layout, that the original layout should be rearranged or permuted into the preferred data layout. The computing environment can also be configured to determine a mapping between the original layout and the preferred layout. In some instances, the mapping can indicate a permutation or rearrangement necessary to return the preferred layout to the original layout. In various instances, the mapping can indicate a stride or offset between physical locations of items of the data in the original and preferred layouts. The computing environment can be configured to associate the mapping with at least one of the data, the computing environment, or the operation (or set of operations). The computing environment can then use the mapping as needed (e.g., lazily) to support access to the rearranged or permuted data by other operations configured to expect the original layout.

In this manner, the disclosed embodiments can enable a computing environment to perform an operation (or set of operations) using a preferred data layout—thereby reducing the time required to perform the operation (or set of operations)—while accommodating operations with differing preferred layouts and ensuring that operations expecting a particular layout do not access the wrong data. The disclosed embodiments therefore improve the performance and usability of such computing environments. It should be appreciated that the disclosed embodiments are not limited to use in computing environments—but rather may improve the performance of any computing device configured to perform operations having a preferred layout (e.g., embedded systems or the like).

A computing environment consistent with the disclosed embodiments may also provide an improved user experience. As preferred layouts may be automatically determined, unsophisticated users may be able to realize the performance improvements provided by such layouts. Users may also be relieved of the burden of tuning data layouts for operations (or sequences of operations) in order to obtain optimal performance. By maintaining a mapping from the preferred layout to the original layout, the disclosed embodiments can enable users to access data input to or generated by the operations in a familiar or convenient layout. Data in a familiar or convenient layout may be easier for users to visualize and inspect (e.g., in order to fine-tune operations). Thus the mapping can improve the usability of the computing environment.

Performing Operations using Preferred Data Layouts

FIG. 1 depicts an application of an exemplary method 100 for performing operations using the preferred data layout, consistent with disclosed embodiments. Method 100 can be performed using a computing environment, which may be implemented using one or more computing devices. As depicted in FIG. 1, certain steps in method 100 can be performed on data stored in original layout 110, while other steps in method 100 can be performed on data stored in preferred layout 120. In some embodiments, method 100 can be performed, at least in part, during compilation or interpretation of instructions to perform operation(s) 125. In some embodiments, the computing environment can be configured to determine original layout 110 and preferred layout 120 at run time. Method 100 can enable the computing environment to determine preferred layout 120 and perform operation(s) 125 on data in preferred layout 120, while enabling performance of operations on data in original layout 110 through a lazily evaluated mapping between original layout 110 and preferred layout 120. In this manner, method 100 can improve the performance and usability of the computing environment.

FIG. 1 depicts input data in the original layout (input data 111) and input data in the preferred layout (input data 121). In this non-limiting example, the input data was acquired by an image sensor comprising a two-dimensional array of pixels. The image sensor obtained a red intensity value, a green intensity value, and a blue intensity value for each pixel. Accordingly, the image data comprises a three-dimensional array (e.g., im(x, y, z)—x is the first dimension, y is the second dimension, z is the third dimension), with each element in the array representing the measured intensity of either red, green, or blue light for a particular pixel in the image sensor.

As a non-limiting example, the operations depicted in FIG. 1 may be or include an image processing pipeline. In this non-limiting example, the pipeline may be configured to convert a video into a cartoon. The video may include a sequence of images. Converting the video into the cartoon may include inputting each image (e.g., in original layout 110), to the pipeline, which can perform a sequence of operations on the image, and outputting each resulting cartoon image. The operations performed by the pipeline can include detecting edges of objects in an image, extending the edges to create enclosed image regions, or overwriting the pixels within each image region with a single dominant color. For example, an edge detection operation can receive the input data and generate a binary mask consisting only of white pixels (edges) and black pixels (not edges). Another exemplary operation can process the binary mask to suppress short edges and extend long edges to create the image regions. The processed binary mask and image can be input to a coloring operation configured to determine the dominant color in each region of the image. The coloring operation can return the cartoon image with each region appropriately colored.

In this non-limiting example, the edge detection and coloring operations can benefit from having the red, green, and blue color values for each pixel consecutive in computer memory (so-called 'interleaved RGB'). The edge detection operation may need to compute the intensity of each pixel (a function of the red, green, and blue color values for each pixel) before finding edges using local intensity gradients. The edge detection operation may therefore benefit from a data layout that stores the color values for each pixel adjacent in memory. The coloring operation may perform a pixel-wise comparison of color values, and may therefore also benefit from a data layout that stores the color values for each pixel adjacent in memory.

In this non-limiting example, the computing environment can be configured to store array data (e.g., input data 111, input data 121, and the like) in column-major layout (e.g., as in Fortran, MATLAB®, GNU Octave, S-Plus, R, Julia, Scilab, or the like). In such a layout, a three-dimension array is converted to a one-dimensional array for storage in memory. Referring to the third dimension of the three-dimension array as "channel", in a column-major layout, the one-dimensional array begins with the elements in the first column of the first channel. The second column of elements in the first channel is then appended to the one-dimensional array. Each subsequent column in the first channel is then appended, until all of the columns in the first channel have been appended to the one-dimensional array. The first column of the second channel is then appended. Each subsequent column in the second channel is then appended, until all of the columns in the second channel have been appended to the one-dimensional array. This process continues until all of the columns in the input data have been appended to the one-dimensional array. The computing environment can then store the one-dimensional array as one or more sequences of consecutive elements in a non-transitory computer-readable medium.

The disclosed embodiments are not limited to embodiments using column-major ordering. Instead, the disclosed embodiments encompass other storage ordering, such as row-major ordering (e.g., as in C, C++, Pascal, SAS, Rasdaman, or the like) or the like.

When the input data is in original layout 110 (e.g., as depicted in input data 111), the first dimension (e.g., the x dimension in im(x, y, z)) in the input data is the pixel row in the image sensor, the second dimension (e.g., the y dimension in im(x, y, z)) is the pixel column in the image sensor, and the third dimension (e.g., the z dimension in im(x, y, z)) is a color channel (red, green, or blue). For example, data point im(2, 2, 1) represents red intensity value 63 in pixel location: row 2 and column 2 in the image. When stored in column-major layout, elements representing the same color channel for adjacent pixels in a column of the image sensor may be adjacent in the non-transitory computer-readable medium. For example, the value representing the red intensity for the pixel in the third row and first column of the image sensor (e.g., the value "54" displayed at im(3, 1, 1) of input data 111 in FIG. 1) may be stored adjacent to the value representing the red intensity for the pixel in the fourth row and first column of the image sensor (e.g., the value "154" displayed im(4, 1, 1) of input data 111 in FIG. 1). In contrast, the values representing the red, green, and blue intensities for a pixel may not be adjacent (e.g., may be widely separated) in storage. For example, in embodiments where the one-dimensional array is stored as a single sequence of elements, the value of the red intensity for a pixel may be separated by r×c from the value of the blue intensity for the same pixel (where r is the number of rows and c is the number of columns in the image sensor).

When the input data has the original layout specified in input data 111, an operation that takes as an input the values of the red, green, and blue intensities for a pixel (e.g., an operation that averages these intensities to obtain an average intensity for each pixel in the image sensor) may require multiple data access operations to obtain the red, green, and blue intensities for the pixel, potentially slowing performance of the operation. For example, obtaining the red, green, and blues intensities may require fetching multiple cache lines when these intensities are stored sufficiently distant in memory.

When the input data is in preferred layout 120 (e.g., as depicted in input data 121), the first dimension (e.g., the z dimension in im2(z, x, y)) in the input data is the color channel, the second dimension (e.g., the x dimension in im2(z, x, y)) in the input data is the pixel row in the image sensor, and the third dimension (e.g., the x dimension in im2(z, x, y)) in the input data is the pixel column in the image sensor. When stored in column-major layout, elements representing the color channels for a pixel in an image sensor may be adjacent in the non-transitory computer-readable medium. For example, the value representing the red intensity for the pixel in the third row and first column of the image sensor (e.g., the value "54" displayed at im2(1, 3, 1) in FIG. 1) may be stored adjacent to the value representing the green intensity for the pixel in the fourth row and first column of the image sensor (e.g., the value "50" displayed at im2(2, 3, 1) in input data 121 of FIG. 1).

When the input data is has the preferred layout specified in input data 121, an operation that takes as an input the values of the red, green, and blue intensities for a pixel (e.g., an operation that averages these intensities to obtain an average intensity for each pixel in the image sensor) may require a single data access operation to obtain the red, green, and blue intensities for a pixel, potentially improving the performance (e.g., increasing speed, reducing the number of data access operations, or the like) of the operation. As a non-limiting example, when adjacent in memory the red, green, and blue intensities for a pixel may be fetched as a single cache line.

In step 113 of method 100, the computing environment can obtain input data (e.g., input data 111) in original layout 110. The obtained data may measurements or observations acquired from devices (e.g., sensor devices), data generated by the computing environment, or data generated by other software programs/algorithms. The disclosed embodiments are not limited to a particular data source. Obtaining the input data can include receiving the input data from one or more computing devices. In some instances the computing environment can be configured to receive the input data from one or more computing devices implementing the computing environment (e.g., from another computing environment, program, process, or the like implemented by the one or more computing devices). The data may be received in a batch (e.g., a file, or the like) or continuously (e.g., from a source of streaming data). The disclosed embodiments are not limited to a particular manner of receiving the data or format in which the data is obtained. Obtaining the input data can additionally or alternatively include retrieving the input data from a computer-readable medium accessible to the computing environment. Obtaining the input data can additionally or alternatively include generating the input data. In some instances, the computing environment can, at least in part, generate the input data. In some instances, the computing environment can generate the input data based at least in part on user input (e.g., data or instructions provide by a user through a user interface of the computing environment).

In step 123 of method 100, the computing environment can be configured to rearrange or permute the input data into a preferred layout (preferred layout 120). In some embodiments, step 123 can include sub-steps of determining the original layout of the input data, determining the preferred layout, and rearranging or permuting the input data into the preferred layout. Step 123 can further include a sub-step of generating a mapping between original layout 110 and preferred layout 120. For convenience of explanation, the disclosed embodiments are described herein with respect to such sub-steps. However, the disclosed embodiments are not limited to such an approach: the computing environment may, in some embodiments, omit determination of the original layout or determine the rearrangement or permutation of the input data into the preferred layout in a single step. As may be appreciated, when the computing environment determines that rearrangement or permutation is not warranted, the computing environment can perform operations 125 without rearranging or permuting the data.

The computing environment can determine original layout 110 of the input data based on a datatype of the input data, data sources or operations associated with the input data, or metadata associated with the input data. The computing environment may then determine how to rearrange or permute the input data based, in part, on the determined original layout.

In some embodiments, the datatype may expressly or implicitly specify the layout of the input data. For example, input data 111 may be of a datatype that implicitly specifies that the first dimension of input data 111 is a row position of a pixel in an image sensor, the second dimension is a column position of the pixel in the image sensor, and the third dimension is a color channel. As an additional example, input data 111 may be of a datatype that permits express labeling of dimensions of the data. For example, input data 111 can be an instance of a deep-learning array (e.g., dlarray) data type. The dlarray data type may permit the association of express labels with the dimensions of the data. Such express labels can indicate that the first dimension is row position, the second dimension is column position and the third dimension is color channel. In various embodiments, the computing environment may not attempt to determine the semantics (e.g., whether a first dimension indicates row position, color channel, or the like) of the original layout. Instead, in such embodiments, the computing environment can determine that the input data is a multi-dimensional array having a certain number of dimensions, each dimension having a certain size.

In various embodiments, data sources or operations associated with the input data may expressly or implicitly specify the layout of input data 111. In some instances, the computing environment can determine original layout 110 of input data 111 based on one or more operations used to generate the input data or data sources from which the input data was obtained. In some instances, an operation may be configured to generate data having a particular layout. For example, a convolution operation may be configured to generate a multi-dimensional array with a first dimension having a size of 256, a second dimension having a size of 256, and a third dimension having a size of 8. The convolution operation may implicitly (e.g., by the ordering of the dimensions) or expressly (e.g., by labels associated with the dimensions) define a semantic meaning for the dimensions of the multi-dimensional array. In this example, the convolution operation may expressly or implicitly define the first and second dimensions as spatial dimensions, and the third dimension as a channel dimension. Each channel may represent the result of convolving a different kernel with the input to the convolution operation. In various instances a data source may be configured to provide data having a particular layout (e.g., a data source may stream log file data in common log format (CLF)).

In various instances, the computing environment can determine original layout 110 based on one or more operations configured to process the input data (e.g. operation(s) 125 or the like). In embodiments where the operation(s) configured to process the input data are known in advance (e.g., when the determination of the original layout is specified at compile or interpretation time, or otherwise prior to run-time), the computing device can be configured to determine the layout of the data based on how the input data is processed by these operations. In some instances, an operation may have an input schema or argument list. The computing environment can be configured to infer original layout 110 from how the input data is input to the operation.

As a non-limiting example of inferring an input data layout from an operation, a computing environment may infer the original layout of input data including three-dimensional images (e.g., medical images, such as MRI images or CT scans) from an operation configured to be performed on these images. The operation may specify a single argument in the form of a multi-dimensional array with a batch dimension as the first dimension, followed by a channel dimension, a depth dimension, a height dimension, and a width dimension. The operation may be configured to accept the input data as the specified single argument. Based on the configuration and specification of the operation, the computing environment can determine that the input data is laid out with a batch dimension as the first dimension, followed by a channel dimension, a depth dimension, a height dimension, and a width dimension. As may be appreciated, the operation may be capable of processing data in different formats, so even when the operation is configured to accept the input data in the original layout, the operation may perform better when the operation is in the preferred layout.

In various instances, the computing environment can determine original layout 110 based on metadata associated with the input data. In some embodiments, the metadata may be generated by the computing environment, a user, or another operation or process implemented by the computing environment. The metadata may include identifiers (e.g., labels or the like) associated with portions of the input data (e.g., the dimensions of a matrix, fields of a structure, or the like) that specify the semantics (e.g., row, column, color channel), of these portions of the input data. As a non-limiting example, a structure storing an array of measurements obtained at different sensor locations over time may include metadata specifying that a first column of the array corresponds to location and a second column of the array corresponds to time.

The computing environment can determine preferred layout 120 of the input data based on at least one characteristic of: the computing environment or computing device implementing the computing environment; the input data; or the operation. Characteristics of the computing environment or computing device can include a number of available threads, an amount of memory (e.g., main memory, local memory, cache, scratchpad memory, or the like) available for storing the data. In some instances, a layout enabling use of more threads or enabling efficient parallelization of the operation may be preferred. As used herein "the number of available threads" can depend on, for example, a current number of threads and a threshold number of threads. In some embodiments, the threshold number of threads may be a limit on the number of threads the computing environment can support. In various embodiments, the threshold number of threads may be a number of threads such that creating additional threads beyond that number may be expected to result in a performance decrease or a performance increase less than an predetermined threshold. In such embodiments, the threshold number of threads may be determine heuristically or based on empirically determined performance data. The threshold number of threads may be specific to a computing environment, or device(s) implementing the computing environment. The disclosed embodiments are not limited to any particular method of determine the threshold number of threads. In various embodiments, a layout enabling data to be stored in the available memory when accessed by the operation (e.g., as opposed to paged in from secondary memory) may be preferred.

In some embodiments, characteristics of the input data used to determine preferred layout 120 can include the dimensions of the input data. In some embodiments, a layout supporting longer contiguous data access operations may be preferred. For example, given a three-dimensional matrix A with dimensions x, y, and z. The length of dimension x is 2, the length of dimension y is 2, and the length of dimension z is 10. Suppose x is the first dimension of A, y is the second dimension of A, and Z is the third dimension of A. Then when A is stored in column-major format, the stored elements will be:

[A(1,1,1), A(2, 1, 1), A(1, 2, 1), A(2, 2, 1), A(1, 1, 2), . . . , A(2, 2, 10)]

In general, in this non-limiting example, the longest contiguous data access along a dimension of A is of length 2. Furthermore, an operation configured (or configurable) to access data consecutively along dimension z may require an input/output operation for each element accessed. In contrast, when A is permuted so that dimension z is the first dimension, the elements of A stored in column-major format would be:

[A(1,1,1), A(2, 1, 1), A(3, 1, 1), A(4, 1, 1), A(5, 1, 1), . . . , A(10, 2, 2)]

In general, when rearranged so that dimension z is the first dimension, the longest contiguous data access along a dimension of A is of length 10. Furthermore, an operation configured (or configurable) to access data consecutively along dimension z may access multiple consecutive data elements in a single input/output operation, thereby reducing the time required to perform the operation as compared to an operation unable to access multiple consecutive data elements in a single input/output operation.

In some embodiments, characteristics of the input data used to determine preferred layout 120 can include the semantics of the input data. For example, an operation may have a known preferred layout (e.g., channel-row-column may be the preferred layout for a convolution operation). The input data may specify which dimensions of the input data correspond to channel, row, and column, respectively.

In some embodiments, characteristics of an operation can include at least one order of data access for the operation. The data access order can depend on the particular operation. In some instances, for example, an operation can include accessing each element in a multi-dimensional array. The operation may implement this access using loops corresponding to each dimension of the array. The order of data access can be determined by the nesting of these loops. For example, given a three-dimensional array A(i, j, k) where I is the length of the first dimension, J is the length of the second dimension, and K is the length of the third dimension, an operation squaring each element of A can be implemented with three nested loops:

for i=1: I
for j=1: J
for k=1: K
A(i, j, k)=A(i, j, k)$^2$
end
end
end

In this implementation, consecutive elements of A along the kth dimension may be sequentially accessed. Rearranging A such that consecutive elements of A along the kth dimension are stored adjacently may allow multiple data elements to be accessed in a single input/output operation, thereby reducing the time required to perform the operation. Alternatively, A could be implemented:

for j=1: J
for k=1: K
for i=1: I
A(i, j, k)=A(i, j, k)$^2$
end
end
end

In this implementation, consecutive elements of A along the ith dimension may be sequentially accessed. Rearranging A such that consecutive elements of A along the ith dimension are stored adjacently may allow multiple data elements to be accessed in a single input/output operation, thereby reducing the time required to perform the operation.

In some embodiments, the computing environment can determine the preferred layout of the input data based, at least in part, on historical performance data. The historical performance data can include CPU usage, processor time, memory usage, number or frequency of cache hits, or other performance data suitable for evaluating the efficiency or speed of the operation. In some embodiments, the computing environment can use historical performance data obtained previously during execution of a program, script, command, or the like. In some instances, a program may involve repeated performance of an operation. The computing environment may acquire performance data for one or more of these repeats. The acquired performance data may be used to determine a data layout for the operation in subsequent repeats. In some instances, the computing environment may compare performance data for differing data layouts to determine a preferred data layout. In such instances, when the input data to an operation is a multi-dimensional matrix, the computing environment may determine the time to perform the operation using different permutations of the input data. Such a determination can be performed during execution of a program, script, command, or the like. The computing environment may then select the permutation of the input data resulting in the fastest performance of the operation for use in subsequent repeats of the operation.

In some embodiments, the computing environment may determine a preferred layout for an operation during execution of a program, script, or the like using performance data acquired during the same execution of that program, during a prior execution of that program, or during execution of another program (e.g., in the same programming language) including the same operation.

As depicted in FIG. 1, the computing environment can be configured to perform multiple operations (e.g., operations 127, 129, and 131) on the input data. The operations may be or include multiple instances of the same operation, or may be or include multiple instances of different operations. In some embodiments, the computing environment can be configured to determine a preferred layout based on the next of the multiple operations. In various embodiments, the computing environment may be configured to determine a preferred layout based on the multiple operations as a whole.

Consistent with disclosed embodiments, the computing environment may be configured to determine a preferred layout for each of the multiple operations. In some embodiments, the computing environment may proceed to rearrange or permute input data 111 when the same layout is preferred for each of the multiple operations. In various embodiments, the computing environment may determine a set of potential preferred layouts for each of the multiple operations. As described herein, the set of potential preferred layouts for each operation can be determined based on characteristics of the input data, the computing device implementing the computing environment, the operation; or historical performance data.

In some embodiments, the computing environment may be configured to identify a potential preferred layout common to all of the operations. The computing environment can select the common layout as the layout for performance of the operations. As an example of selecting a common layout, input data 111 can be a three-dimensional matrix A(i, j, k). The computing environment can be configured to determine an ordering of potential preferred layouts for operation 127, operation 129, and operation 131. For example, the computing environment can be configured to determine that the data layout A(k, i, j) enables performance of operation 127 faster than data layout A(j, k, i), which in turn is faster than data layout A(i, j, k). The computing environment can similarly determine that data layout A(j, k, i) enables performance of operations 129 and 131 faster than data layouts A(k, i, j) and A(i, j, k). Based on the determination that data layout A(j, k, i) is the preferred data layout for all of the operations, the computing environment can rearrange or permute A into this layout.

In some embodiments, the computing environment may be configured to determine a potential preferred layout suitable for the operations as a whole. In some instances, this determination may depend on characteristics of each of the operations. To continue the prior example, the computing environment may determine processing times for each potential data layout for each of operation 127, operation 129, and operation 131. The computing environment may determine the sums of these times for each potential data layout. The computing environment may then select as the preferred data layout the layout with the lowest sum of processing times. In some instances, the determination of a suitable preferred layout may depend on characteristics of the operations as a whole. For example, the computing environment may determine for each potential data layout (e.g., based on historical performance data) an overall processing time for operation 127, operation 129, and operation 131 combined. The computing environment may then select as the preferred data layout the layout with the lowest overall processing time.

As may be appreciated, the disclosed embodiments are not limited to reducing processing time. Other operation characteristics that can be addressed include the number of data access operations, or memory usage.

After determining the original layout and preferred layout, the computing environment can rearrange or permute the input data into the preferred layout (assuming, for the sake of explanation, that the original layout differs from the preferred layout). Rearranging or permuting the input data can include reordering the dimensions of a matrix, converting structured data into unstructured data (e.g., converting objects storing key-value data into, for example, a flat file or similar layout lacking structures or express values indicating the semantics of the data), altering a hierarchy of the input data (e.g., replacing an array of structures with a structure of arrays, or the reverse). In the example depicted in FIG. 1, the computing environment can be configured to permute input data 111 into input data 121 by making the third dimension the first dimension. For example, the following pseudocode describes such a permutation:

order=[3 1 2]
permute (A, order)

In this non-limiting example, A is the input data, order is an array specifying a reordering of the dimensions of A (e.g., reorder dimension 3 as the first dimension, dimension 1 as the second dimension, and dimension 2 as the third dimension), and permute (A, order) is a function that reorders the dimensions of A according to the ordering specified in the array order.

The computing environment can be configured to determine a mapping between the original layout and the preferred layout. In some embodiments, the mapping can enable the computing environment to correctly access data in preferred layout 120 using data access operations configured for the original layout 110 (e.g., original layout operations). In some embodiments, the computing environment may only use the mapping in response to an attempt by an original layout operation to access the data. Therefore, unless necessary to support access by an original layout operation, resources need not be expended in converting the input data back to original layout 110. In this manner, the disclosed embodiments can reduce the resource requirements of, and improve the performance of, the computing environment.

In some instances, the mapping can be implemented using an offset formula. The offset formula can convert the location of a data element stored in original layout 110 into the location of a data element stored in preferred layout 120. As a non-limiting example, an offset formula between an array $A_{xyz}$ (three-dimensional array with a first dimension x, a second dimension y, and a third dimension z) and an array $A_{zxy}$ (a permutation of $A_{xyz}$ having z as the first dimension), where the length of each of dimensions x and y is 256, and the length of dimensions z is 8, can be:

$$\text{data}(k+8*(i-1)*(256*8)*(j-1))$$

Where data(index) is the one-dimensional array storing data in the $A_{zxy}$(k, i, j) layout (e.g., in column-major order). Accordingly, to access data stored in the $A_{zxy}$ (k, i, j) layout as if it were stored in the $A_{xyz}$(i, j, k) layout, the i, j, and k values of the desired element can be used to compute an index into data( ) according to the above formula. For example, to retrieve $A_{xyz}$(2, 3, 4), the value in the one-dimensional array at the 4+8×1×(256×8)×2)=32772 may be accessed. As may be appreciated, the disclosed embodiments are not limited to a particular offset formula.

In various embodiments, the mapping can be implemented using a permutation vector. The permutation vector can indicate a permutation suitable for converting preferred layout 120 back to original layout 110. For example, as described above:

Permute (a, [2 3 1])

can convert preferred layout 120 to original layout 110. The mapping can be stored as the vector [2 3 1].

The computing environment can be configured to associate the mapping with the input data (e.g., as stored in the preferred layout). In some embodiments, the input data may be of a data type configurable to store metadata specifying the mapping. In some instances, attributes of the data type (which may be optional attributes) can specify the mapping. In some embodiments, the mapping can be associated with the computing environment. In some instances, the computing environment can store an object that specifies the mapping (e.g., by storing an indication of, or coefficients of, an offset formula). The computing environment can further store an association between the object and the input data.

In step 125, the computing environment can be configured to perform one or more operations. The disclosed embodiments are not limited to any particular method of performing the operations. The operations can be performed as repeats or iterations of a loop, or as a pipe or sequence of operations. The operations can be sequential (e.g., the output of one operation can be the input of exactly one other operation) or at least partially parallel (e.g., the output of at least one operation can be the input of two or more operations). In some embodiments, performing the operations can include generating intermediate data. The intermediate data can be generated by an operation and used as the input in a subsequent operation. The intermediate data can be in the preferred layout. When the one or more operations are configured to generate intermediate data, the mapping can be associated with the intermediate data, as described herein. In various embodiments, performing the operation can include updating the input data. Updating the input data can include inputting the data to an operation and overwriting the input data with the result of the operation. The overwritten input data can remain in the preferred layout.

In step 133, the computing environment can be configured to generate output data 133. In some embodiments, output data 133 can be one or more items in the preferred layout. For example, when input data 121 is a multi-dimensional array in the preferred layout, output data 133 can be one or more multi-dimensional arrays in the preferred layout. The computing environment can be configured to associate with the output data a mapping from original layout 110 to preferred layout 120, as described herein.

In step 115, after rearranging the input data into input data 121, or during or after performance of operation(s) 125, the computing environment may perform an additional operation requiring access to the input data 121, intermediate data, or output data 133. The additional operation may be configured to access the input data 121, intermediate data, or output data 133 in original layout 110.

In some instances, the additional operation may expressly or implicitly specify that accessed data be in original layout. As a non-limiting example, the first two dimensions of exemplary input data 111 may correspond to the row and column of a pixel in an image sensor. The third dimension of input data 111 corresponds to color channel. The additional operation may be (or include) an operation to average input data 111 over the color channel (e.g., to obtain an average intensity for each pixel in the image sensor):

B=mean(A, 3)

In this example, the mean operation computes the mean across the third dimension (the color channel in original layout 110). But since the computing environment permuted A into preferred layout 120, the third dimension of A has become the column position of the pixel in the image sensor. Should the additional operation be performed on the permuted data, B will incorrectly be the average intensity, for each color channel, of the pixels in each column of the image sensor.

Consistent with disclosed embodiments, the computing environment may therefore use the mapping between preferred layout 120 and original layout 110 to access the data. In some embodiments (e.g., where input data 121 is input only to the first of the multiple operations), the computing environment can be configured to permute the input data back from preferred layout 120 to original layout 110 using the mapping. In various embodiments, the computing environment can be configured to modify access operations reading elements of A such that the correct elements are read. As a non-limiting example, an offset formula, such as the offset formula given above, can be applied to modify read operations to A such that the correct elements are read. For example, to access input data stored in the $A_{zxy}(k, i, j)$ layout as if it were stored in the $A_{xyz}(i, j, k)$ layout, the i, j, and k values of the desired elements can be used to compute an index into the one-dimensional array in memory storing the input data in the $A_{zxy}(k, i, j)$ layout, as described herein. Alternatively, the input data can be permuted back into the original layout using the mapping or a copy of the input data in the original layout can be created using the mapping.

The disclosed embodiments are not limited to using A in the performance of additional computational operations. In some embodiments, A can be used in user interface operation. For example, the computing environment can be configured to display some or all of A in response to an instruction received from a user. In some instances, the display may depict a predetermined portion of A (e.g., a subset of the rows and columns of the first channel of A as a matrix). A user may expect A to be displayed in original layout 110 and may be confused by, or unable to interpret, a display of A in preferred layout 120.

Additional Exemplary Data Layouts

The disclosed embodiments are not limited to input data in the form of a numeric array. The inventors recognize and appreciate the potential for preferred data layouts to improve operation performance in the context of sparse data, ragged data, named data, nested data structures, tiled and distributed data, or other data structures. Consistent with disclosed embodiments, a computing environment can determine a preferred layout for such a data structure and rearrange or permute an original data layout into the preferred data layout, while maintaining a mapping back to the original data layout. Should an operation subsequently attempt to access the data structure in the original data layout, the computing environment can be configured to using the mapping to enable the operation to access the data as if it remained in the original data layout. In this manner, the disclosed embodiments can improve the performance and usability of the computing environment with respect to a variety of data structures.

Sparse Data Layouts

The disclosed embodiments may use sparse representations, such as sparse arrays, as preferred layouts. A sparse representation of an original data structure can omit (e.g., not store or the like) values less than a magnitude threshold (e.g., sub-threshold values), while retaining values greater than the magnitude threshold (e.g., supra-threshold values). The sparse representation can include metadata that identifies the locations of the supra-threshold values in the original data structure. The threshold for omitting data may be predetermined or automatically selected based on the operation, input data values, or other suitable factors.

Consistent with disclosed embodiments, the original data structure can correspond to the original layout described herein. The sparse representation can correspond to the preferred layout. The metadata that identifies the locations of the supra-threshold values in the original data structure can correspond to the mapping between the original and preferred layouts. The computing environment can be configured to adjust each operation to ensure that it correctly processes the sparse representation. The mapping may further be used to ensure that additional operations configured to access the input data in the original layout obtain the correct values.

Using sparse representations as preferred layouts can improve the performance of an operation or set of operations. With respect to data processing pipelines, for example, sub-threshold values present at one point in a pipeline may persist throughout the rest of the pipeline. A computing environment consistent with disclosed embodiments can omit such sub-threshold values using a sparse representation and configure the pipeline to omit computations dependent on such sub-threshold values. By omitting sub-threshold values and computations dependent on sub-threshold values, a computing environment consistent with the disclosed embodiments may improve the performance of the data pipeline, while supporting the correct performance of operations configured to use the original representation.

As a non-limiting example of using a sparse representation as a preferred layout, a computing environment can use a sparse array to represent the activation values in a deep learning operation pipeline. The sparse array can omit entire channels which contain only sub-threshold values (e.g., zero channels), thereby enabling faster performance of certain operations, such as convolution operations or element-wise scalar multiplication. In some embodiments, the computing environment can omit separable convolutions performed on zero channels, further improving performance of the deep learning pipeline. A sparse representation may also reduce the memory required to store the input data, thereby improving performance (particularly on GPUs), as reducing the memory requirements may enable use of faster, but more memory-intensive, processing methods.

Ragged Data Layouts

A computing environment consistent with disclosed embodiments may convert ragged data to padded data. Ragged data can be input data that differs in size or resolution. For example, an image processing algorithm may operate on images obtained by different cameras with different resolutions. Each obtained image can be zero-padded to match a predetermined image resolution or an image resolution of the highest-resolution obtained image. As an additional example, sequence data, such as audio or a piece of text, can be of different lengths. Each obtained sequence can be zero-padded to match the largest obtained or anticipated sequence length. The zero-padding can be removed after processing is complete.

Converting ragged data to padded data may improve performance of an operation or set of operations. Certain operations, such as convolution, may be performed more efficiently on padded data. Highly parallelizable hardware devices, such as GPUs, may perform operations more rapidly using padded data. Furthermore, memory access may become more efficient when ragged data is converted to padded data, should a computing environment or device support memory pre-allocation, as memory accesses may be coalesced. However, ragged data may require less memory overall and may be preferable to padded data for certain operations, such as element-wise addition.

Accordingly, a computing environment consistent with disclosed embodiments may be configured to determine whether a padded data layout or ragged data layout is preferable. The computing environment can convert ragged data into padded data (or padded data into ragged data) and maintain a mapping between the original and preferred layouts. The computing environment can thereby enable performance of operations on the preferred data layout, while enabling the correct performance of operations configured to access the data in the original layout.

Named Data Layouts

A computing environment consistent with disclosed embodiments may convert named data to indexed data. Data structures including named data can support accessing the named data using an associated name or label. In some instances, for example, C++ structures may identify observations or values in the data structure by name, enabling users to access these observations or values by name. Likewise, table objects implemented in various programming languages may support accessing table data by name. Some programming languages support performing operations based on the names associated with data. Such operations may include grouping data alphabetically by name, or accessing data items having names matching a criterion (e.g., satisfying a regular expression).

While convenient for users and suitable for some operations, accessing data by name may be inefficient compared to accessing data using numerical indexing. A computing environment consistent with disclosed embodiments may convert named data to expressly or implicitly indexed data. As a non-limiting example, a first tabular dataset may contain a forecast maximum temperature in each of a number of regions. A second tabular dataset may contain product sales in a number of locations (the sales locations not necessarily matching the temperature regions). This two-table, named-data arrangement may be convenient for users, enabling them to access store sales information by name and date in one table and review contemporaneous weather data in the other table. However, this arrangement may be inefficient for training a machine learning algorithm to predict sales in each location based on forecasted temperature.

A computing environment consistent with disclosed embodiments may convert the original data layout (two tables storing named data) to a preferred layout (e.g., a uniform array of values with a time dimension and one or more spatial dimensions storing the temperature region or sales location). The computing environment can be configured to maintain a mapping between the original and preferred layouts. The computing environment can thereby enable performance of operations on the preferred data layout, while enabling the correct performance of operations configured to access the data in the original layout.

Nested Data Structures

A computing environment consistent with disclosed embodiments may rearrange nested data structures to improve the performance of operations using such data structures. Nested data structures include those in which elements of a structure are themselves structures. Such nesting can enable grouping of related elements and thereby improve the usability of the data.

Nested data structures may include arrays of structures (e.g., a homogeneous array of structures, each structure containing heterogeneous data) and structures of arrays (e.g., a single structure containing arrays, each array being homogenous). The computing environment can be configured to convert between an array of structures and a structure of arrays, depending on the preferred layout for an operation or set of operations. In some embodiments, as described herein, the computing environment can determine whether converting the data for a particular operation would improve the locality of the accessed data in memory.

As a non-limiting example, input data including a time series of measurements may be applied to a filtering operation. In a first implementation of the filtering operation, each processing unit (such as a compute thread) may filter all the measurements acquired at a particular time. Such an implementation may benefit from storing adjacent in memory the measurements acquired at the same time. Accordingly, when performing the filtering operation according to the first implementation, a computing environment consistent with disclosed embodiments may convert the input data into an array of records layout, with each record including the measurements acquired at a particular time. Records adjacent in time may then be stored adjacent in memory. In a second implementation of the filtering operation, each processing unit may filter all the measurements of a certain type. Such an implementation may benefit from storing the measurements of the same type adjacent in memory. Accordingly, when performing the filtering operation according to the second implementation, a computing environment consistent with disclosed embodiments may convert the input data into a structure containing fields, each field being an array storing one type of measurement. The elements of each array may then be stored adjacent in memory.

The computing environment may determine whether to use the first or second implementation based on characteristics of the data; characteristics of the computing environment or computing device implementing the computing environment; or historical performance data. For example, as described with regards to FIGS. 3A to 3D, the computing environment may select the implementation and the preferred data layout based on hardware criteria (such as the availability of compute threads) and features of the data (such as the number of fields in each record and the length of the time series).

Tiled and Distributed Data

A computing environment consistent with disclosed embodiments may be configured to rearrange input data for improved parallel processing. Such input data may be distributed across multiple storage media, such as the memories of multiple computers in a compute cluster. As would be appreciated by those of skill in the art, a computing environment may have multiple options for distributing such data. Such options may include dividing the input data into horizontal panels consisting of some number of rows or vertical panels consisting of some number of columns. Array data distributed in such a manner can be efficiently processed by simple algorithms such as element-wise addition, where each processor in the cluster can operate independently on its own panel of the data. It can also be used by matrix multiplication, which involves multiplying entire rows by entire columns. Options for distributing data may further include distributed data in a block-cyclic pattern (e.g., the data can be divided into tiles and assigned to processors in a round-robin fashion). Such a distribution scheme can be used by parallelized versions of linear algebra routines for operations such as matrix factorization.

How the data is distributed may affect the performance of the parallelized operations. In particular, the choice of preferred format is important for minimizing the communication between processes which is generally the bottleneck for such parallel computation. Furthermore, changing the distribution scheme may be inefficient as such changes may involve many-to-many communication between computers in the compute cluster. Accordingly, the computing environment can be configured to determine a preferred data layout for performing the parallelized operations based on characteristics of the data; the operation, and the computing environment or cluster implementing the computing environment. The computing environment may be configured to maintain a mapping to the original layout, to enable correct performance of operations configured to use the data in the original layout.

Exemplary applications suitable for improvement using the disclosed embodiments may include numeric algorithms that solve systems of linear equations, such as finite element solvers or system modelling. Such applications may perform multiple complex linear algebra operations. Consistent with disclosed embodiments, a computing environment implementing such applications may convert input data to the block-cyclic scheme at the first operation that requires it, and keep it in that format from then on until the output is a vector, at which point it would be converted back to a horizontal or vertical paneled scheme to ensure the data remains evenly distributed across the cluster.

Selecting an Input Data Layout

Figure 2:
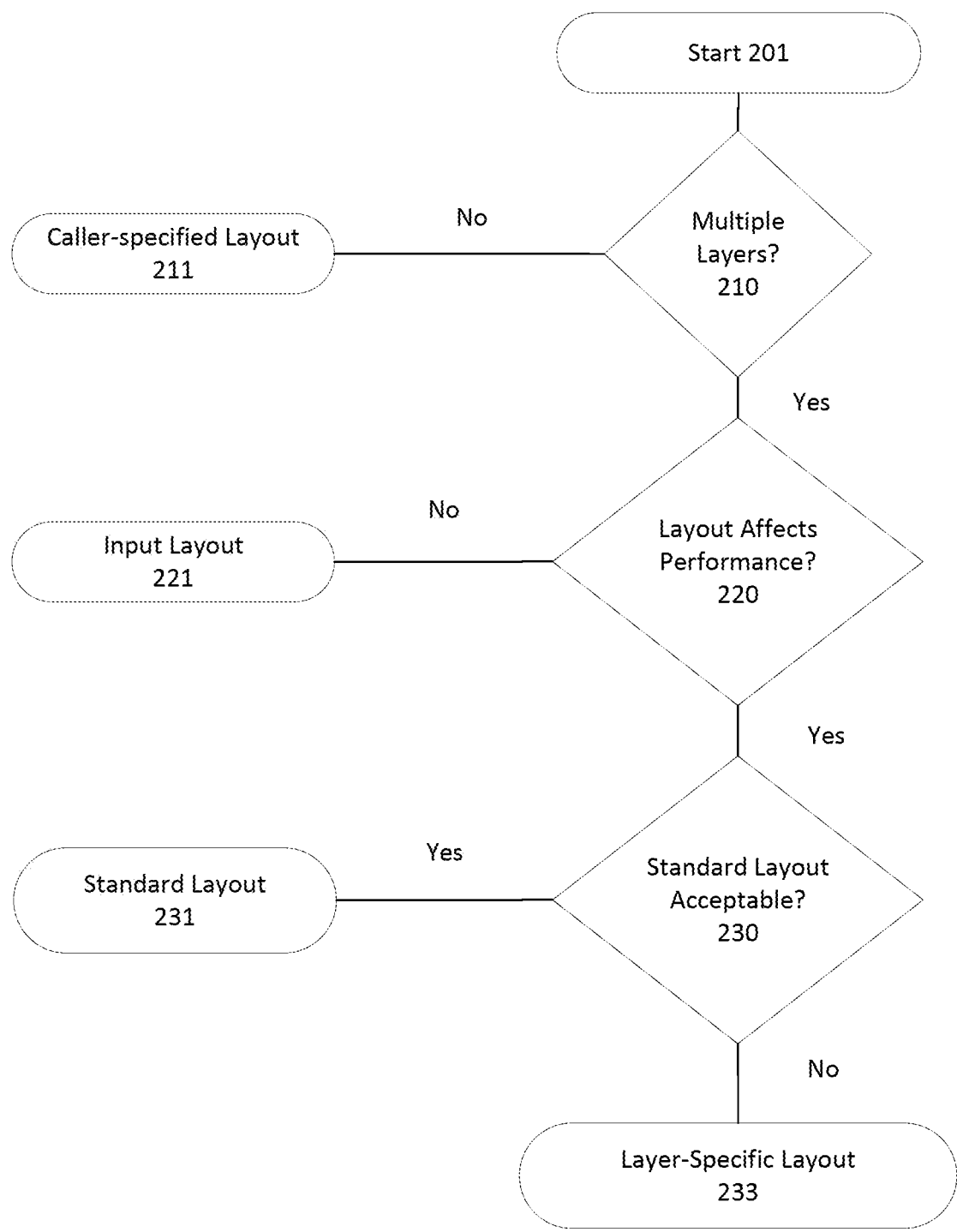
FIG. 2 depicts an exemplary method for selecting an input data layout, consistent with disclosed embodiments.

FIG. 2 depicts an exemplary method 200 for selecting a preferred layout for input data, consistent with disclosed embodiments. Method 200 may be performed by the computing environment that performs the operation, or by another computing environment. For ease of explanation, method 200 is described with regards to an application in which input data is propagated through multiple convolutional layers of a neural network to generate an output. However, it can be appreciated that method 200 is generally applicable to the selection of an input data layout for an operation or set of operations.

The computing environment can start method 200 in step 201 when determining whether to rearrange the input data into a preferred layout (e.g., step 123 of FIG. 1). The output of method 200 may be an indication of whether to rearrange or permute the data, or an indication of the preferred data layout (e.g., layout 121).

After starting in step 201, method 200 can proceed to step 210. In step 210, the computing environment can determine whether the input data will be propagated through (e.g., processed by) a single layer or multiple layers. When the computing environment is executing a single layer and the output data will be returned to the main process, the computing environment may be configured to select a default layout for the output. The default layout may be specified by a user, the function call, API invocation, or the like (e.g., in a function call signature, API contract, or the like) that caused the computing environment to input the data to the layer. In such instances, method 200 may proceed to step 211. In step 211, the computing environment may select the specified layout as the preferred layout and method 200 may terminate. When the computing device is executing multiple layers, the computing environment may proceed to step 220 of method 200.

In step 220, the computing environment can determine whether to modify the layout of the input data. As described herein, the computing environment can base this determination on characteristics of the current layer of the multiple layers. In some embodiments, the computing environment can determine whether the current layer performs operations on each element of the input data independently (e.g., element-wise operations such as adding a value to each element of an array, multiplying each element of an array by a corresponding element of another array, or the like). In such instances, method 200 may proceed to step 221, otherwise the computing environment can proceed to step 230.

In step 221, the computing environment may format the output of the current layer to mirror the formatting of the input to the current layer. In some implementations, such mirroring can improve the processing speed and reduce the memory usage of the current layer, as the current layer need not process the output data into another layout or store output data in memory during such processing. In some embodiments, such mirroring may permit the current layer to further reduce memory usage by overwriting the layer input with the layer output.

In step 230, the computing environment may determine whether to use a standard layout for the current layer. A standard layout may be a layout that provides a performance benefit for a plurality or majority of the multiple layers. Rearranging or permuting the input data into a standard layout may therefore reduce the probability or number of subsequent rearrangements or permutations. The disclosed embodiments are not limited to any specific standard layout, as the standard layout may depend at least on the application. As a non-limiting example of such a standard layout, an image processing application can propagate a multi-dimensional array with a batch dimension, a channel dimension, and two spatial dimensions through multiple layers. A plurality of the multiple layers may be convolutional layers. Arranging the input data such that the channel and batch dimensions are the first two major-ordered dimensions may improve data locality and vectorization (thereby improving performance) of such convolutional layers. When the computing environment determines that a standard layout may be used, the computing environment can proceed to step 231. In step 231, the computing environment may select the standard layout and method 200 may terminate. When the standard layout is unsuitable for the current layer (e.g., would result in a performance decrease outweighing the performance cost of rearranging the data), the computing environment may proceed to step 233 of method 200.

In step 233, the computing environment may determine a preferred layout for the current layer. As described herein, the computing environment may reach step 233 when (i) input data is being propagated through multiple layers, (ii) the performance of the current layer depends on the data layout, and (iii) a standard layout is unsuitable for the current layer. In some embodiments, the computing environment can determine the layout in step 233 based on characteristics of the input data, the computing environment and computing device(s) implementing the computing environment, and the current layer. In some embodiments, the current layer may have multiple implementations, so the computing environment may be configured to determine a preferred layout and a corresponding implementation suitable for use with the preferred layout. Additional examples of determining a preferred layout for a current layer are provided in FIGS. 3A to 3D and 4.

Determining a Preferred Layout for Input Data and an Operation Implementation—Tabular Data FIGS. 3A to 3D depict selection of an operation implementation and corresponding preferred layout for tabular data 300, consistent with disclosed embodiments. As described herein, such selection can depend on characteristics of the input data, characteristics of the computing environment or computing device(s) implementing the computing environment, and characteristics of the operation. The examples provided in FIGS. 3A to 3D are not intended to be limiting, but rather to demonstrate particular applications of methods 100 and 200.

Tabular data 300 can include responses to survey questions by participants. As a non-limiting example, tabular data 300 can be responses by patients to a mental health questionnaire. Tabular data 300 may be stored in a variety of layouts. In some instances, tabular data 300 may include a record for each participant. The record for a participant may include the responses as an array of numeric or enumeration data, or as named data (e.g., attribute values, key-value pairs, or the like). In various instances, tabular data 300 may be stored as a multi-dimensional array, with a row for each participant and a column for each response.

A variety of operations can be performed on tabular data 300. Two such operations are combining responses across participants and combining responses across questions. In the context of a mental health questionnaire, combining responses to a question across patients may enable a user to assess the diagnostic utility of a question, while combining responses across questions for a participant may enable a user to assess whether a diagnosis applies to the patient.

The operations performed on tabular data 300 can be implemented in different ways. Two example implementations are (i) using a single thread to access and combine the data necessary to generate an output, and (ii) using atomic operations to update an intermediate value.

Figure 3A:
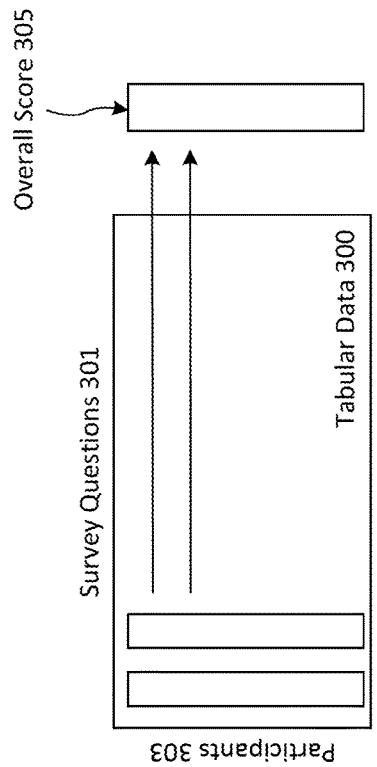
FIGS. 3A to 3D depict selection of an operation implementation and corresponding input data layout for tabular data, consistent with disclosed embodiments.

FIG. 3A depicts a scenario in which responses are combined across questions to generate an overall score 305 for each participant. In this example, the computing environment determines that the operation should be implemented using a single thread to access and combine the responses for each participant. This determination may be based on the number of survey questions and the number of participants. As a non-limiting example, the computing environment may select this implementation when the number of survey questions is at least 10 times the number of participants. As an additional non-limiting example, the computing environment may select this implementation when the number of participants is less than 10 times the number of available threads. When the operation is implemented using a single thread to access and combine the responses for each participant, the input data may be laid out to adjacently store the responses to survey questions for each participant. For example, tabular data 300 may be stored in row-major order as a multi-dimensional matrix with survey question as the first dimension and participant as the second dimension. Storing tabular data 300 in this layout may involve rearranging or permuting tabular data 300 when tabular data 300 is originally stored in a different layout.

Figure 3B:
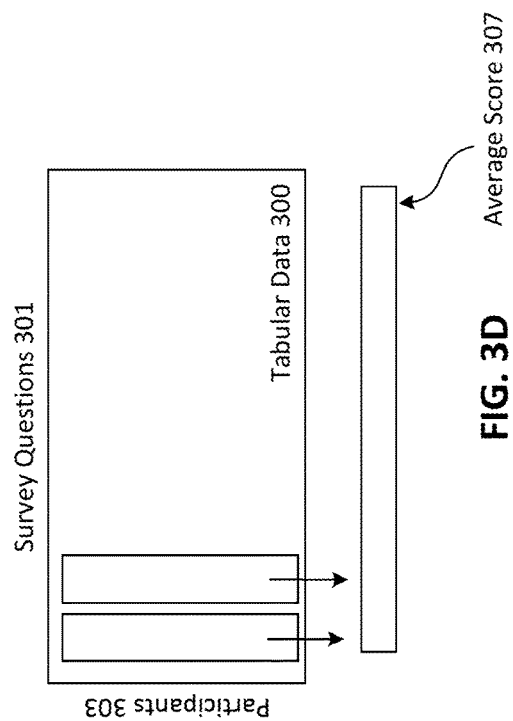

FIG. 3B also depicts a scenario in which responses are combined across questions to generate an overall score 305 for each participant. In this additional example, the computing environment can determine that the operation should be implemented using a single thread to access the responses for each question. Intermediate data may store the result for each participant. Each thread may atomically update the intermediate data for each participant based on the response that participant provided to the question. The computing environment may select an implementation using atomic operations based on the number of survey questions and the number of participants. As a non-limiting example, the computing environment may select this implementation when the number of participants is at least 10 times the number of survey questions. As an additional non-limiting example, the computing environment may select this implementation when the number of survey questions is less than 10 times the number of available threads. When the operation is implemented using a single thread to atomically update intermediate data, the input data can be laid out to adjacently store the responses for each participant to a survey question. For example, tabular data 300 may be stored in column-major order as a multi-dimensional matrix with participant as the first dimension and survey question as the second dimension.

Figure 3C:
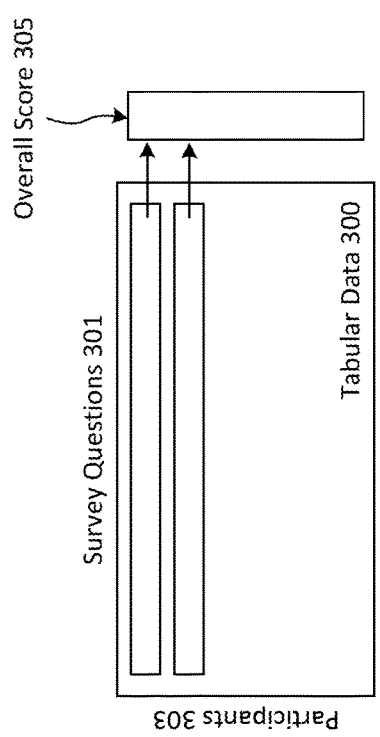

FIG. 3C also depicts a scenario in which responses are combined across participants to generate an average score 307 for each question. In this additional example, the computing environment can determine that the operation should be implemented using a single thread to access the responses for each participant. Intermediate data may store the result for each survey question. Each thread may atomically update the intermediate data for each survey question based on the response provided by each participant to each survey question. The computing environment may select this implementation based on the number of survey questions and the number of participants. As a non-limiting example, the computing environment may select this implementation when the number of survey questions is at least 10 times the number of participants. As an additional non-limiting example, the computing environment may select this implementation when the number of participants is less than 10 times the number of available threads. When the operation is implemented using a single thread to atomically update intermediate data, the input data can be laid out to adjacently store the responses for each participant to each survey question. For example, tabular data 300 may be stored in row-major order as a multi-dimensional matrix with survey question as the first dimension and participant as the second dimension. As described above, storing tabular data 300 in this layout may involve rearranging or permuting tabular data 300 when tabular data 300 is originally stored in a different layout.

Figure 3D:
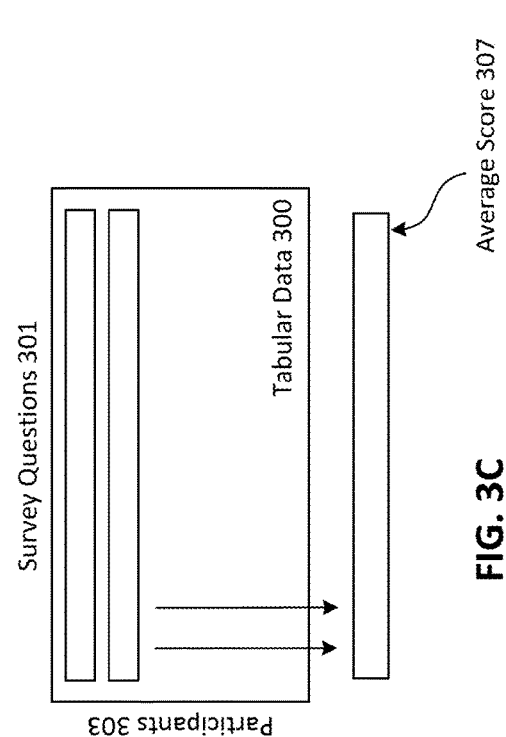

FIG. 3D depicts a scenario in which responses are combined across questions to generate an average score 307 for each question. In this example, the computing environment determines that the operation should be implemented using a single thread to access and combine the responses for each question. This determination may be based on the number of survey questions and the number of participants. As a non-limiting example, the computing environment may select this implementation when the number of participants is at least 10 times the number of survey questions. As an additional non-limiting example, the computing environment may select this implementation when the number of survey questions is less than 10 times the number of available threads. When the operation is implemented using a single thread to access and combine the responses for each survey question, the input data may be laid out to adjacently store the responses for each participant to a survey question. For example, tabular data 300 may be stored in column-major order as a multi-dimensional matrix with participant as the first dimension and survey question as the second dimension. As described above, storing tabular data 300 in this layout may involve rearranging or permuting tabular data 300 when tabular data 300 is originally stored in a different layout.

While the foregoing examples described multi-dimensional array data layouts, structured data layouts may be similarly affected. When the responses to survey questions differ in data type, tabular data 300 may be stored as a record of arrays or an array of records. When the computing environment selects an implementation that combines responses across participants, a record of arrays may be the preferred layout. When the computing environment selects an implementation that combines responses across survey questions, an array of records may be the preferred layout.

Determining a Preferred Layout for Input Data and an Operation Implementation—Convolution As would be appreciated by those of skill in the art, deep learning is a kind of machine learning in which input data is processed in a series of consecutive operations, each of which detects features in the data by finding patterns in the data output from the previous operation. Deep learning approaches are described as 'deep' because they typically contain a relatively large number (between 10 and several hundred) of operations (e.g., neural network layers, or the like).

Image classification is an exemplary application of deep learning. In image classification applications, an input image can be processed through a pipeline of operations to generate an output representing the probability that the input image depicts an object (e.g., the probability an image depicts a dog, a cat, a person, a car, etc.). In some image classification approaches, the input may be a batch of color images. Each image may have a red channel, a green channel and a blue channel. Each element in the input data may be the intensity of a color at a pixel location in the image.

The pipeline of operations may be configured to process data in the format of a uniform, homogeneous numeric array with four dimensions. Consistent with disclosed embodiments, a computing environment can construct an object for use in performing the operations. The object may contain the data and a mapping between the original and preferred layouts. In some embodiments, the mapping can be a stored permutation between the original and preferred layouts. As an example, when the original layout is ordered HWCB (height, width, channel, batch) and the preferred layout is ordered CHWB (channel, height, width, batch) the object may store the permutation vector [2 3 1 4] so that the CHWB layout can be lazily permuted back to the original layout in response to an attempt to access the data in the original layout. In some embodiments, the mapping can be implicit. In some instances, the object can store an indication of the original layout and an indication of the current layout (e.g., an "original layout" attribute of the object can store the string "HWCB" and a "current layout" attribute of the object can store the string "CHWB"). The computing environment can be configured to use the explicit or implicit mapping to handle access requests that expressly or implicitly assume that the data is in the original format. In some instances, the computing environment can modify such requests to accommodate the current layout. In various embodiments, the computing environment can use this mapping to permute the data into the original layout (or create a permuted copy of the data in the original layout) to accommodate the request.

Figure 4:
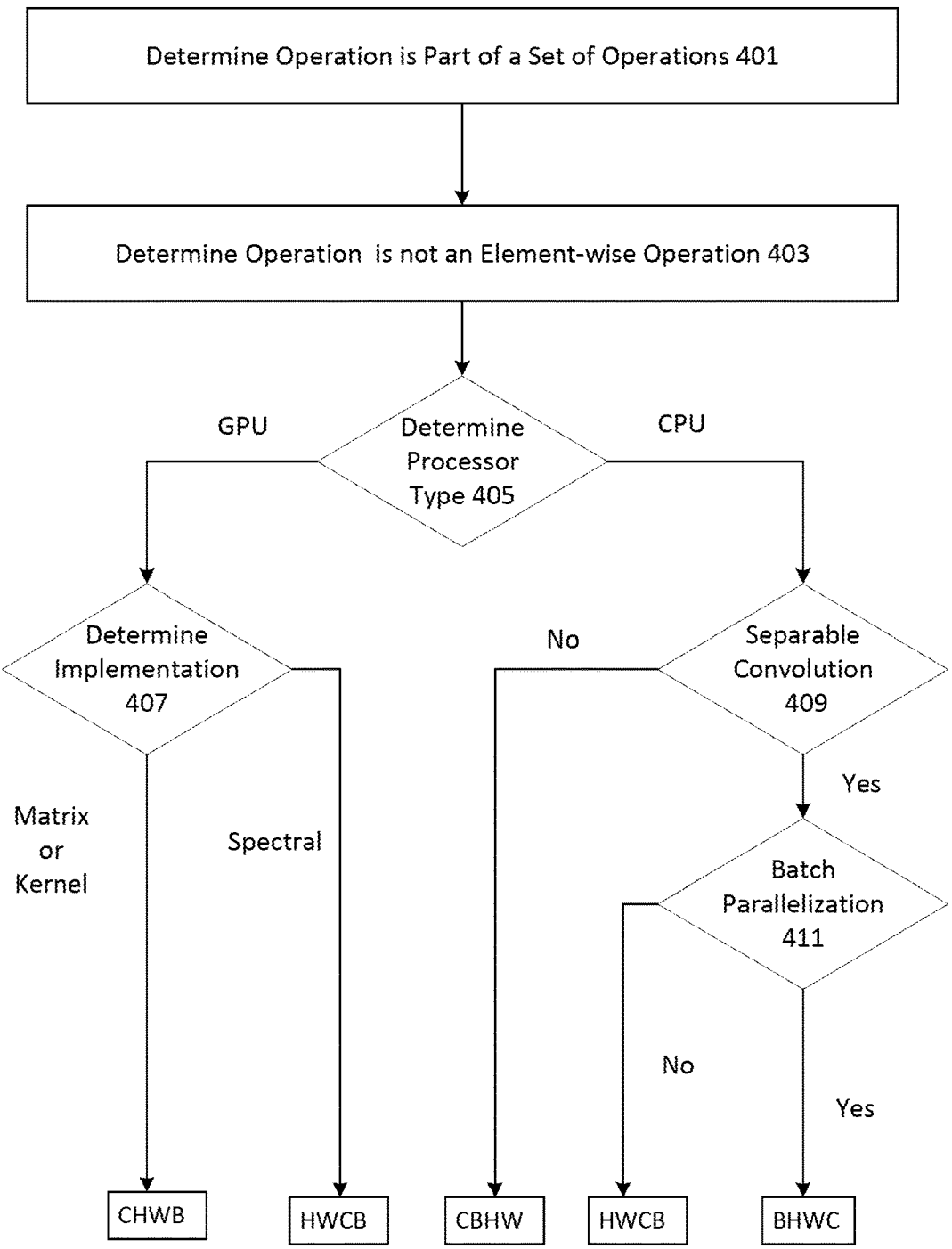
FIG. 4 depicts an exemplary method of determining a preferred layout for a convolution operation, consistent with disclosed embodiments.

As described above with regards to FIG. 1, the computing environment can be configured to determine a preferred layout. FIG. 4 depicts an exemplary method 400 of determining a preferred layout for a convolution operation (e.g., as used in a deep-learning application), consistent with disclosed embodiments. As would be appreciated by one of skill in the art, a convolution operation can include sliding a window of filter weights over input data. At each location of the window, an output value is generated based on the values of the input data within the window and the filter weights. In some applications, the products of input data values within the window and corresponding filter weights are summed to produce the output value. As would be appreciated by those of skill in the art, the general approach described in method 400 is not limited to convolution operations.

Prior to performing method 400, the computing environment may obtain input data. The input data may be in an original layout. As would be appreciated by those of skill in the art, this original layout may be a HWCB (Height-Width-Channel-Batch) layout. Some users may prefer to store image input data in an HWCB layout, as input data stored in this layout may be conceptualized as a stack of single-color images. When performing convolution operations, however, the HWCB data layout may be inferior to other data layouts in terms of operation speed and number of data access operations required. Method 400 may determine whether a potential performance improvement (e.g., in speed or number of data access operations required) resulting from rearranging or permuting the input data into a preferred layout would outweigh the computational resources required to perform the rearrangement or permutation.

In step 401 of method 400, the computing environment may determine that the operation is part of a set of operations. In some embodiments, when the operation is not part of a set of operations, the computing environment may not permute the data into a preferred layout, as the computing resource costs (e.g., time, cost or the like) required to perform the permutation may exceed the computing resource benefit (e.g., the reduction in time to perform the convolution operation). In such instances, method 400 may terminate (e.g., the input data may be processing in its original layout). In this non-limiting example, the operation is part of a set of operations and method 400 proceeds to step 403.

In step 403 of method 400, the computing environment may determine that the operation is not an element-by-element operation (e.g., adding a scalar value to each element of a multi-dimensional matrix, multiplying each element of a multi-dimensional matrix by a scalar value, or the like). The performance of element-wise operations may not depend on a layout of the input data, so the computing environment may not realize a benefit from rearranging or permuting the data in such instances. Accordingly, when the operation is an element-by-element operation, method 400 may terminate. In such instances, method 400 may terminate (e.g., the input data may be processing in its original layout). In this non-limiting example, the operation is a convolution operation (and therefore not an element-by-element operation) and method 400 proceeds to step 405.

In step 405 of method 400, the computing environment may determine the type of processor(s) that will perform the operation. When the processor(s) are configured for vectorized processing (e.g., a graphical processing unit (GPU), or the like), method 400 may proceed to step 407. When the processor(s) are configured for independent task execution (e.g., a central processing unit (CPU) or the like), method 400 may proceed to step 409.

In step 409, the computing environment can be configured to determine a data access pattern of the operation. In this non-limiting example, the operation is a convolution operation. As described herein, convolution operations include two sub-types: separable and dependent convolutions. As described above, the input data may include multiple channels. In a dependent convolution, the window of filter weights is applied to all channels. In such embodiments the window of filter weights may be a three-dimensional matrix of filter weights, with a depth equal to the number of channels in the input data. For example, where $W_{ijk}$ is a matrix of filter weights, $A_{nmk}$ is a multi-dimensional array (n>i, m>j), and O is an element of the output:

$$O = \Sigma_k \Sigma_j \Sigma_i A_{n+i,m+j,k} * W_{ijk}$$

In a separable convolution, a window of filter weights is applied to an individual channel. In such embodiments the window of filter weights may be a two-dimensional matrix of filter weights. For example, where $W_{ij}$ is a matrix of filter weights, $A_{nmk}$ is a multi-dimensional array (n>i, m>j), and Ok is an element of the output for the $k_{th}$ channel:

$$O_k = \Sigma_j \Sigma_i A_{n+i,m+j,k} * W_{ij}$$

Consistent with disclosed embodiments, separable convolutions can be used to refine the information within a single input feature based on spatial relationships, while dependent convolutions use information from all incoming features to detect higher-level features.

In this non-limiting example, when the convolution is a dependent convolution, the preferred layout is CBHW and method 400 terminates. When the convolution is a separable convolution, method 400 can proceed to step 411.

In step 411, the computing environment can determine whether processing of the input data can be batch parallelized. In some embodiments, the computing environment can be configured to determine whether the computing device performing the operations supports parallel batch processing. In some instances, this determination can depend on the hardware of the computing device (e.g., whether the computing device includes, for example, a vector processing unit capable of processing multiple images in parallel). In various embodiments, the computing environment can be configured to determine whether the input data includes at least a threshold number of batches. The threshold number of batches can depend on the relative computational resources (e.g., increase in time, memory, processing power, or the like) expended to permute the data into the preferred layout, versus the computational benefits (e.g., decrease in time, memory, processing power, or the like) achieved from performing the operations in the preferred layout. In some embodiments, the threshold number of batches can be a number between 4 and 16, such as 8.

When the computing device supports parallel batch processing and the number of batches exceeds the threshold number, the computing environment can determine that the preferred layout is BHWC (Batch-Height-Width-Channel) or the like. Such a configuration can enable the computing device to efficiently perform separable convolutions on multiple images in parallel. When the computing device does not support parallel batch processing, or the number of batches is less than the threshold value, the preferred layout may be or remain HWCB (Height-Width-Channel-Batch). In either case, method 400 may terminate.

In step 407, the computing environment may determine a GPU implementation of the convolution. In some embodiments, three different implementations may be possible: a matrix multiplication implementation, a kernel implementation, and a spectral implementation. The choice of implementation can depend on characteristics of the data and the computing environments.

The matrix multiplication implementation may be selected when a criterion dependent on the dimensions of the weights matrix and the number of channels in the input data is satisfied. In some embodiments, the criterion may be satisfied when the product of the height of the weights matrix, the width of the weights matrix, and the number of channels in the input data is less than a number (e.g., a number between 100 and 400, or greater). In this implementation, the input data values overlapped by the weights matrix in each convolution may be reshaped into a row in a two-dimensional input data matrix. The weight matrix can be reshaped into a weights column (when multiple weights matrices are convolved with the input data to generate multiple output channels, each weight matrix can be convolved into a separate column). The input data matrix can be multiplied by the weights column to generate an output column, with each row in the output column containing the result of one convolution. When the input data is convolved with multiple weights matrices (e.g., to generate multiple outputs), each weight matrix can be reshaped into a weights column in a two two-dimensional reshaped weights matrix. As would be appreciated by those of skill in the art, this implementation requires duplication of the input data and substantial reshaping of the input data and weights matrices. Therefore, in some embodiments, the amount of free memory available to the computing environment may be a factor in determining whether the matrix implementation is selected. Other factors can be important here, for instance, whether or not the convolution is strided. The preferred input data layout for this implementation may be CHWB, as in this layout the data for each transformed matrix row may be at least partially adjacent in memory.

The kernel implementation may be selected when the local cache of the computing device performing the convolution can store the input data overlapped by the weights matrix. For example, given input data including 4 channels and a 3×3 weights matrix, the computing device may select the kernel implementation when the local cache can store 36 elements (9 elements per channel times 4 channels). As would be appreciated by those of skill in the art, the amount of data that the local cache can store may depend on the datatype or representation of the input data and the computing device performing the convolution. In some embodiments, the number of elements may be between 25 and 100, or greater. In these embodiments, each GPU thread can compute one output pixel. As recognized in the art, when the kernel implementation is selected, the preferred layout may be CHWB.

The spectral implementation may be selected when the conditions favoring the matrix multiplication implementation and the kernel implementation are not satisfied. In this implementation, the input data and weight matrix can be converted to an N dimensional spectrum, where N is the number of spatial dimensions in the input data (e.g., height, width, depth). In this example, where the input data includes height and width, the spectrum is a two-dimensional spectrum. The computing device can convert the input data and weight matrix using a fast Fourier transform, or the like. The spectra are multiplied element-wise and then the inverse Fourier transform is applied. In this case usually the most efficient layout is HWCB.

The above examples are not intended to be limiting. Given the above disclosure, additional implementations would be appreciated by those of skill in the art (e.g., Winograd or tiled convolution algorithms). A computing environment determining whether to use such implementations and, if so, the preferred data layout, may rely on characteristics of the computing device implementing the convolution operation (e.g., the amount of memory, number of threads, or the like), characteristics of the input data (e.g., input data size in the spatial dimensions), or characteristics of the convolution operation (e.g., whether or not this is a separable convolution).

As would be appreciated by those of skill in the art, the disclosed embodiments are not limited to performance by a computing environment. For example, a stand-alone tool for performing both preferred layout and original layout operations may be configured to implement the systems and methods disclosed herein. Similarly, the operations may be performed in the context of a simulation environment. For example, data may be input to a deep learning pipeline simulated in such an environment. Consistent with disclosed embodiments, the simulation environment may determine a preferred layout for processing the data through the deep learning pipeline. The simulation environment may associate a mapping with the input data and use this mapping lazily to permit original layout operations to access the data in the original layout.

Figure 7:
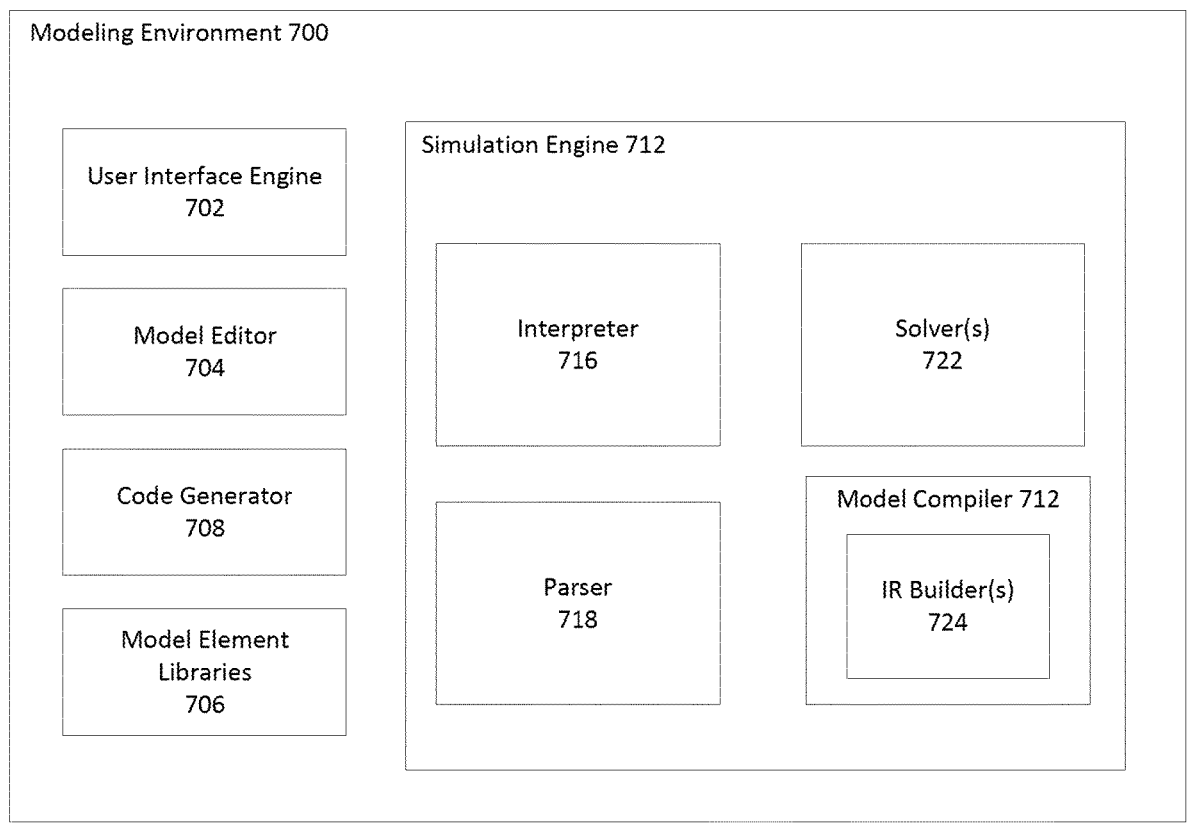
FIG. 7 depicts an exemplary modeling environment in which systems or methods, described herein, may be implemented, consistent with disclosed embodiments.

In some embodiments, a computing environment or simulation environment may implement the disclosed embodiments in the context of embedded systems. A coder can be configured to generate code supporting the determination of a preferred layout and association of a mapping to the original layout. Such code may be deployed may be deployed to a device configured to perform a set of operations in the preferred layout. The device may be or include a central processing unit (CPU), a graphics processing unit (GPU), a digital signal processor (DSP), an accelerated processing unit (APU), a microprocessor, a microcontroller, a field-programmable gate array (FPGA), an application-specific integrated circuit (ASIC), or another suitable processing component FIG. 7 depicts an exemplary modeling environment useable to determine a preferred layout for input data processed by one or more operations, while maintaining a mapping usable to lazily access the input data in the original layout of the input data, consistent with disclosed embodiments. The modeling environment 700 can include a User Interface (UI) engine 702, a model editor 704, one or more model element libraries 706, a code generator 708, and a simulation engine 712.

The UI engine 702 can create and present one or more User Interfaces (UIs), such as Graphical User Interfaces (GUIs) and/or Command Line Interfaces (CLIs), on a display of a data processing device, such as a workstation, laptop, tablet, etc. The GUIs and CLIs can provide a user interface to the modeling environment 700, such as a model editing window. The model editor 704 can perform selected operations on a model, such as open, create, edit, and save, in response to the user inputs or programmatically. In some embodiments, the UIs can include UIs for providing parameter value to the modeling environment, such as user interface 600 described above with regards to FIG. 6.

The simulation engine 712 can include an interpreter 716, a parser 718, a model compiler 720, and one or more solvers (e.g., solver(s) 722). The model compiler 720 can include one or more Intermediate Representation (IR) builders (e.g., IR builder(s) 724). In some implementations, the one or more IR builders can be included or associated with the solvers 722. The simulation engine 712 can execute, e.g., compile and run or interpret, computer-generated, executable models using solver(s) 722. For example, solver(s) 722 can generate a set of equations for a model and can solve the set of equations. Solver(s) 722 can also generate a solution for an in-memory, intermediate representation (IR) of a model that represents a set of equations. Solver(s) 722 can generate the solution for the IR using numerical techniques. Exemplary solvers include one or more fixed-step continuous time solvers, which can utilize numerical integration techniques, and one or more variable-step solvers, which may, for example, be based on the Runge-Kutta or Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The MathWorks, Inc. (March 2017 ed.)

In some embodiments, simulation engine 712 (or a component thereof, such as sover(s) 722) can be configured to implement the disclosed systems and methods. For example, simulation engine 712 can be configured to determine a preferred layout for input data processed by one or more operations, while maintaining a mapping usable to lazily access the input data in the original layout of the input data.

The disclosed embodiments are not limited to embodiments in which simulation engine 712 implements the disclosed systems and methods. For example, the disclosed systems and methods may also be implemented by a stand-alone tool that interacts with simulation engine 712 to provide the disclosed functionalities Code generator 708 can access a model and can generate code for the model, for example as described above with regards to FIG. 5. In some embodiments, the generated code can be source code, which can be compiled by the model compiler 720, and executed by one or more processors outside of the modeling environment 700. The generated code can thus be standalone code relative to the modeling environment 700. Examples of generated code include Ada, Basic, C, C++, C #, FORTRAN, machine code, assembly code, and HDL code, such as VHDL, Verilog, SystemC, or netlists, among others, which may be used to synthesize a programmable logic device. In some embodiments, the generated code can support identification of a preferred layout for input data and rearranging or permuting the input data into the preferred layout, while maintaining a mapping usable to lazily access the input data in the original layout of the input data.

Exemplary modeling environments include the MATLAB® technical computing environment (TCE) and the Simulink® model-based design environment both from The Math Works, Inc. of Natick, Mass., as well as the Simscape™ physical modeling system, the SimEvent® discrete-event modeling tool, and the Stateflow® state chart tool also from The Math Works, Inc., the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level modeling environment can contain less implementation detail, and thus operate at a higher level than certain programming languages, such as the C, C++, C #, and SystemC programming languages.

With a modeling environment 700, simulated execution of a model can be carried out, e.g., to approximate the operation of a dynamic system. Simulated execution of a model may also be referred to as simulating the model. Models constructed within the modeling environment 700 may include textual models, graphical models, such as block diagrams, state-based models, discrete-event models, physical models, and combinations thereof. A graphical model can include icons or blocks that represent computations, functions or operations, and interconnecting lines or arrows among the blocks can represent data, signals, or relationships among those computations, functions, or operations. The icons or blocks, moreover, can be selected by the user from one or more of the libraries or palettes 706 that contain icons or blocks for the blocks supported by the modeling environment 700. A model editor GUI can include a Run button that can be selected by the user. The modeling environment 700 can also be configured to receive a run command entered by the user, e.g., in the GUI or in a Command Line Interface (CLI). In response to the user selecting the Run button or entering the run command, the simulation engine 712 can execute the model, and can present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 700 may implement a declarative language. A declarative language is a language that expresses the logic of a computation without describing its control flow. A declarative language can describe what a program must accomplish in terms of the problem domain, rather than describe how to accomplish it as a sequence of the programming language primitives. In some cases, a declarative language can implement single assignment in which variables are assigned once and only once. Examples of declarative languages include the Simulink® model-based design environment, which is a time-based language, the Modelica modeling language, and the LabVIEW graphical programming system, HDL, the Prolog language, and the Haskell language, among others. Behaviors of at least some of the model elements and connection elements of a model can include computational implementations that are implicitly defined by a declarative language. The modeling environment may also implement or integrate imperative language (like C, C++, MATLAB, etc.) or a combination of declarative and imperative languages.

It should be understood that the modeling environment 700 is intended for illustrative purposes and that the present disclosure can be used with other modeling environments. For example, in some implementations, the code generator 708 and/or the compiler 720 can be separate from the modeling environment 700.

One or more of the user interface engine 702, the model editor 704, the code generator 708, the model compiler 720, and the simulation engine 712 can be implemented through one or more software modules and/or libraries containing program instructions that perform the methods described herein when executed on logic circuitry of one or more processors. The software modules can be stored in a memory, such as a main memory, a persistent memory, or a computer readable media, of a workstation, server, or other data processing machine or device, and executed by one or more processors. Other computer readable media can also be used to store and execute these program instructions, such as non-transitory computer readable media, including optical, magnetic, or magneto-optical media. In some embodiments, one or more of the user interface engine 702, the model editor 704, the code generator 708, the model compiler 720, and the simulation engine 712 can comprise hardware registers and combinational logic configured and arranged to produce sequential logic circuits. In some embodiments, various combinations of software and hardware, including firmware, can be utilized to implement the described methods.

Suitable code generators for use with the present disclosure include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers can be used in addition to or alternative to those described for the modeling environment 700.

Figure 5:
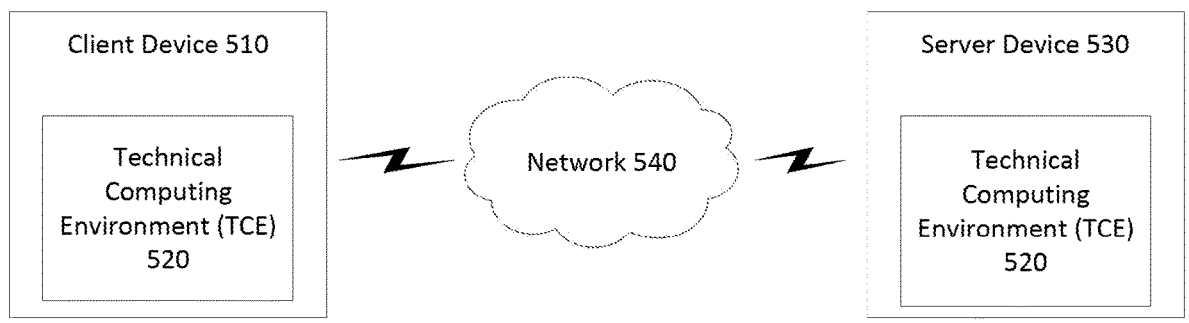
FIG. 5 depicts an exemplary computing environment in which systems or methods, described herein, may be implemented, consistent with disclosed embodiments.

FIG. 5 depicts an exemplary computing environment 500 in which systems and/or methods, described herein, may be implemented, consistent with disclosed embodiments. For example, TCE 520 may be configured to determine preferred data layouts for operations. As shown in FIG. 5, environment 500 may include a client device 510, which may include a programming environment (e.g., TCE 520). Furthermore, environment 500 may include a server device 530, which may include the programming environment (e.g., TCE 520), and a network 540. Devices of environment 500 may interconnect via wired connections, wireless connections, or a combination of wired and wireless connections.

Client device 510 may include one or more devices capable of receiving, generating, storing, processing, and/or providing program code or information associated with program code (e.g., text, a token, an error, a pattern, etc.). For example, client device 510 may include a computing device, such as a desktop computer, a laptop computer, a tablet computer, a mobile phone (e.g., a smart phone, a radiotelephone, etc.), or a similar device. Client device 510 may receive input text, via TCE 520, in a programming language associated with TCE 520. In some implementations, client device 510 may receive information from and/or transmit information to server device 530.

Client device 510 may host TCE 520. TCE 520 may include any hardware-based component or a combination of hardware and software-based components that provides a computing environment that allows tasks to be performed (e.g., by users) related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 520 may include a programming language that supports dynamic typing (e.g., the M language, a MATLAB® language, a MATLAB-compatible language, a MATLAB-like language, Julia, Python, etc.) that can be used to express problems and/or solutions in mathematical notations.

For example, TCE 520 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 520 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state-based analysis and/or design, etc.

TCE 520 may further provide mathematical functions and/or graphical tools (e.g., for creating plots, surfaces, images, volumetric representations, etc.). In some implementations, TCE 520 may provide these functions and/or tools using toolboxes (e.g., toolboxes for signal processing, image processing, data plotting, parallel processing, etc.). In some implementations, TCE 520 may provide these functions as block sets or in another way, such as via a library, etc.

TCE 520 may be implemented as a text-based programming environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based programming environment (e.g., Simulink® software, Stateflow® software, SimEvents® software, Simscape™ software, etc., by The MathWorks, Inc.; VisSim by Visual Solutions; Lab View® by National Instruments; Dymola by Dynasim; SoftWIRE by Measurement Computing; WiT by DALSA Coreco; VEE Pro or System Vue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of programming environment, such as a hybrid programming environment that includes one or more text-based programming environments and one or more graphically-based programming environments.

TCE 520 may include a programming language (e.g., the MATLAB language) that may be used to express problems and/or solutions in mathematical notations. The programming language may allow a user to enter commands to be executed by TCE 520. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 520. During run-time, when the statement "A='hello'" is executed, the data type of variable "A" may be a string data type. Later when the statement "A=int32([1, 2])" is executed, the data type of variable "A" may be a 1-by-2 array containing elements whose data type are 32-bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 520 may provide mathematical routines and a high-level programming language suitable for non-professional programmers. TCE 520 may provide graphical tools that may be used for creating plots, surfaces, images, volumetric representations, or other representations. TCE 520 may provide these routines and/or tools using toolboxes (e.g., toolboxes for signal processing, image processing, data plotting, parallel processing, etc.). TCE 520 may also provide these routines in other ways, such as, for example, via a library, a local data structure, a remote data structure (e.g., a database operating in a computing cloud), a remote procedure call (RPC), and/or an application programming interface (API). TCE 520 may be configured to improve runtime performance when performing computing operations. For example, TCE 520 may include a just-in-time (JIT) compiler.

Server device 530 may include one or more devices capable of receiving, generating, storing, processing, and/or providing information associated with code. For example, server device 530 may include a computing device, such as a server, a desktop computer, a laptop computer, a tablet computer, or a similar device. In some implementations, server device 530 may host TCE 520. In some implementations, client device 510 may be used to access one or more TCEs 520 running on one or more server devices 530. For example, multiple server devices 530 may be used to execute program code (e.g., serially or in parallel), and may provide respective results of executing the program code to client device 510.

In some implementations, client device 510 and server device 530 may be owned by different entities. For example, an end user may own client device 510, and a third party may own server device 530. In some implementations, server device 530 may include a device operating in a cloud computing environment. In this way, front-end applications (e.g., a user interface) may be separated from back-end applications (e.g., program code execution). Additionally, or alternatively, server device 530 may perform one, more, or all operations described elsewhere herein as being performed by client device 510.

Network 540 may include one or more wired and/or wireless networks. For example, network 540 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
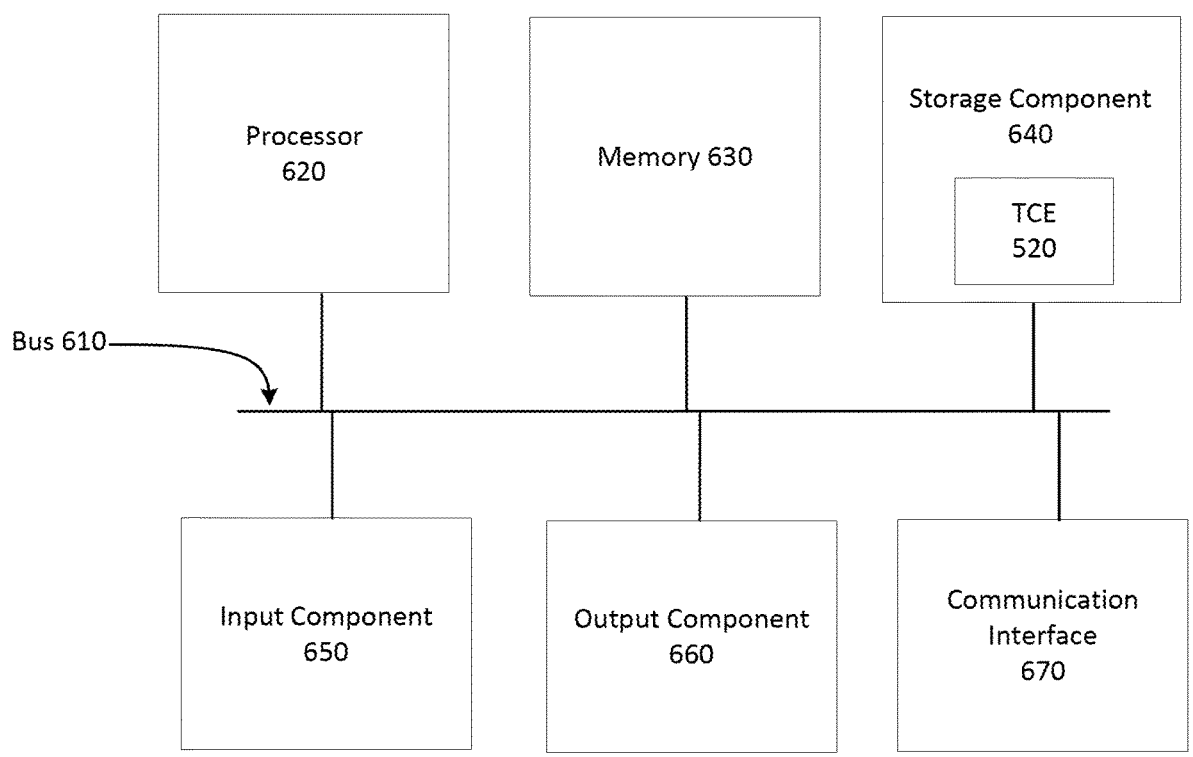
FIG. 6 depicts an exemplary device suitable for use consistent with the disclosed embodiments.

FIG. 6 depicts an exemplary device 600 suitable for use consistent with the disclosed embodiments. Device 600 may correspond to client device 510, server device 530, or a like device. In some implementations, client device 510, server device 530, or the like device may include at least one of device 600 or at least one component of device 600. As shown in FIG. 6, device 600 may include a bus 610, a processor 620, a memory 630, a storage component 640, an input component 650, an output component 660, and a communication interface 670.

Bus 610 can include a component that permits communication among the components of device 600. Processor 620 can be implemented in hardware, firmware, or a combination of hardware and software. Processor 620 can be a central processing unit (CPU), a graphics processing unit (GPU), an accelerated processing unit (APU), a microprocessor, a microcontroller, a field-programmable gate array (FPGA), an application-specific integrated circuit (ASIC), or another suitable processing component. In some implementations, processor 620 can include one or more processors capable of being programmed to perform a function. Memory 630 can include a random-access memory (RAM), a read-only memory (ROM), or another suitable dynamic or static storage device (e.g., a flash memory, a magnetic memory, and/or an optical memory) that stores information and/or instructions for use by processor 620.

Storage component 640 can store information and/or software related to the operation and use of device 600. For example, storage component 640 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. In some embodiments, storage component 640 may include programs or instructions suitable for implementing TCE 520.

Input component 650 can include a component that permits device 600 to receive information, such as via user input (e.g., a touch screen display, a keyboard, a keypad, a mouse, a button, a switch, and/or a microphone). Additionally, or alternatively, input component 650 can include a sensor for sensing information (e.g., a global positioning system (GPS) component, an accelerometer, a gyroscope, and/or an actuator). Output component 660 can include a component that provides output information from device 600 (e.g., a display, a speaker, and/or one or more light-emitting diodes (LEDs)).

Communication interface 670 can include a transceiver-like component (e.g., a transceiver and/or a separate receiver and transmitter) that enables device 600 to communicate with other devices, such as via a wired connection, a wireless connection, or a combination of wired and wireless connections. Communication interface 670 can permit device 600 to receive information from another device and/or provide information to another device. For example, communication interface 670 can include an Ethernet interface, an optical interface, a coaxial interface, an infrared interface, a radio frequency (RF) interface, a universal serial bus (USB) interface, a Wi-Fi interface, a cellular network interface, or the like.

Device 600 can be configured to perform one or more processes described herein. Device 600 may perform these processes (e.g., a computer-implemented method) in response to processor 620 executing software instructions stored by a non-transitory computer-readable medium, such as memory 630 or storage component 640. A computer-readable medium can be a non-transitory memory device. A memory device can include memory space within a single physical storage device or memory space spread across multiple physical storage devices.

Software instructions can be read into memory 630 or storage component 640 from another computer-readable medium or from another device via communication interface 670. When executed, software instructions stored in memory 630 or storage component 640 can cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 can include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system comprising at least one processor; and
at least one memory containing instructions that, when executed by the at least one processor, cause the system to perform system operations comprising:
    obtaining input data stored in a first layout;
    receiving at least two operations;
    determining a second layout for performing the at least two operations, the second layout:
        independent of the first layout; and
        determined based on at least one of the at least two operations and at least one of:
            a characteristic of the input data;
            a characteristic of the system; or
            historical performance data;
    rearranging or permuting the input data into the second layout;
    determining a mapping between the second layout and the first layout;
    performing the at least two operations using the input data in the second layout;
    during or after performance of the at least two operations, in response to a request by a third operation to access the input data, providing access to the input data in the first layout using the mapping; and
wherein the at least one of the at least two operations is a convolution operation, the input data is a multi-dimensional array having a channel dimension, a batch dimension, and two or more spatial dimensions; and
determining the second layout comprises selecting as a first dimension of the multi-dimensional array one of:
    the channel dimension;
    the batch dimension; or
    one of the two or more spatial dimensions.

2. The system of claim 1, wherein:
the first dimension of the multi-dimensional array is selected based, at least in part, on whether the convolution operation is dependent or separable.

3. The system of claim 1, wherein:
the first dimension of the multi-dimensional array is selected based, at least in part, on a size of the batch dimension.

4. The system of claim 1, wherein:
the system operations further comprise selecting an implementation of the at least one of the at least two operations, the implementation corresponding to the second layout.

5. The system of claim 1, wherein:
the third operation expressly or implicitly specifies that the input data be in the first layout.

6. The system of claim 1, wherein:
determining the second layout based on the at least one of the at least two operations comprises determining the second layout based on a data-access order of the at least one of the at least two operations.

7. The system of claim 1, wherein:
determining the second layout based on the at least one of the at least two operations comprises determining that the at least one of the at least two operations is not an element-wise operation.

8. The system of claim 1, wherein:
determining the second layout based on the at least one of the at least two operations comprises comparing one or more dimensions of the input data and a number of cores or threads in the system.

9. The system of claim 1, wherein:
the system operations further comprise selecting an implementation of the convolution operation, the implementation of the convolution operation being:
    a matrix implementation of the convolution operation;
    a kernel implementation of the convolution operation; or
    a spectral implementation of the convolution operation.

10. A non-transitory, computer-readable medium containing instructions that, when executed by at least one processor of a system, cause the system to perform system operations comprising:
    obtaining input data stored in a first layout;
    receiving at least two operations;

determining a second layout for performing the at least two operations, the second layout:
  independent of the first layout; and
  determined based on at least one of the at least two operations and at least one of:
    a characteristic of the input data;
    a characteristic of the system; or
    historical performance data;
rearranging or permuting the input data into the second layout;
determining a mapping between the second layout and the first layout;
performing the at least two operations using the input data in the second layout;
during or after performance of the at least two operations, in response to a request by a third operation to access the input data, providing access to the input data in the first layout using the mapping; and
wherein the at least one of the at least two operations is a convolution operation, the input data is a multi-dimensional array having a channel dimension, a batch dimension, and two or more spatial dimensions; and
  determining the second layout comprises selecting as a first dimension of the multi-dimensional array one of:
    the channel dimension;
    the batch dimension; or
    one of the two or more spatial dimensions.

11. The non-transitory, computer-readable medium of claim 10, wherein:
  the first dimension of the multi-dimensional array is selected based, at least in part, on whether the convolution operation is dependent or separable.

12. The non-transitory, computer-readable medium of claim 10, wherein:
  the first dimension of the multi-dimensional array is selected based, at least in part, on a size of the batch dimension.

13. The non-transitory, computer-readable medium of claim 10, wherein:
  the system operations further comprise selecting an implementation of the at least one of the at least two operations, the implementation corresponding to the second layout.

14. The non-transitory, computer-readable medium of claim 10, wherein:
  determining the second layout based on the at least one of the at least two operations comprises determining the second layout based on a data-access order of the at least one of the at least two operations.

15. The non-transitory, computer-readable medium of claim 10, wherein:
  the third operation expressly or implicitly specifies that the input data be in the first layout.

16. The non-transitory, computer-readable medium of claim 10, wherein:
  determining the second layout based on the at least one of the at least two operations comprises determining that the at least one of the at least two operations is not an element-wise operation.

17. The non-transitory, computer-readable medium of claim 10, wherein:
  determining the second layout based on the at least one of the at least two operations comprises comparing one or more dimensions of the input data and a number of cores or threads in the system.

18. The non-transitory, computer-readable medium of claim 10, wherein:
  the system operations further comprise selecting an implementation of the convolution operation, the implementation of the convolution operation being:
    a matrix implementation of the convolution operation;
    a kernel implementation of the convolution operation; or
    a spectral implementation of the convolution operation.

19. A method performed by a system, comprising:
  obtaining input data stored in a first layout;
  receiving at least two operations;
  determining a second layout for performing the at least two operations, the second layout:
    independent of the first layout; and
    determined based on at least one of the at least two operations and at least one of:
      a characteristic of the input data;
      a characteristic of the system; or
      historical performance data;
  rearranging or permuting the input data into the second layout;
  determining a mapping between the second layout and the first layout;
  performing the at least two operations using the input data in the second layout;
  during or after performance of the at least two operations, in response to a request by a third operation to access the input data, providing access to the input data in the first layout using the mapping; and
  wherein the at least one of the at least two operations is a convolution operation, the input data is a multi-dimensional array having a channel dimension, a batch dimension, and two or more spatial dimensions; and
    determining the second layout comprises selecting as a first dimension of the multi-dimensional array one of:
      the channel dimension;
      the batch dimension; or
      one of the two or more spatial dimensions.

20. The method of claim 19, wherein:
  determining the second layout based on the at least one of the at least two operations comprises determining the second layout based on a data-access order of the at least one of the at least two operations.

21. The method of claim 19, further comprising selecting an implementation of the at least one of the at least two operations, the implementation corresponding to the second layout.

22. The method of claim 19, wherein:
  the third operation expressly or implicitly specifies that the input data be in the first layout.

* * * * *